(12) United States Patent
Vossough et al.

(10) Patent No.: US 9,449,625 B1
(45) Date of Patent: Sep. 20, 2016

(54) HEAT ASSISTED MAGNETIC RECORDING HEAD HAVING A PLURALITY OF DIFFUSION BARRIER LAYERS

(71) Applicant: Western Digital (Fremont), LLC, Fremont, CA (US)

(72) Inventors: Kris Vossough, Redwood City, CA (US); Marc A. Finot, Palo Alto, CA (US); John Love, Livermore, CA (US); Matthew R. Gibbons, San Jose, CA (US); Ge Yi, San Ramon, CA (US); Yufeng Hu, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/582,902

(22) Filed: Dec. 24, 2014

(51) Int. Cl.
| G11B 11/00 | (2006.01) |
| G11B 5/48 | (2006.01) |
| G11B 5/127 | (2006.01) |
| G11B 5/00 | (2006.01) |
| G11B 5/31 | (2006.01) |
| G11B 5/60 | (2006.01) |

(52) U.S. Cl.
CPC ............. *G11B 5/4866* (2013.01); *G11B 5/127* (2013.01); *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,032,353 | A | 3/2000 | Hiner et al. |
| 6,033,532 | A | 3/2000 | Minami |
| 6,034,851 | A | 3/2000 | Zarouri et al. |
| 6,043,959 | A | 3/2000 | Crue et al. |
| 6,046,885 | A | 4/2000 | Aimonetti et al. |
| 6,049,650 | A | 4/2000 | Jerman et al. |
| 6,055,138 | A | 4/2000 | Shi |
| 6,058,094 | A | 5/2000 | Davis et al. |
| 6,073,338 | A | 6/2000 | Liu et al. |
| 6,078,479 | A | 6/2000 | Nepela et al. |
| 6,081,499 | A | 6/2000 | Berger et al. |
| 6,094,803 | A | 8/2000 | Carlson et al. |
| 6,099,362 | A | 8/2000 | Viches et al. |
| 6,103,073 | A | 8/2000 | Thayamballi |
| 6,108,166 | A | 8/2000 | Lederman |
| 6,118,629 | A | 9/2000 | Huai et al. |
| 6,118,638 | A | 9/2000 | Knapp et al. |
| 6,125,018 | A | 9/2000 | Takagishi et al. |
| 6,130,779 | A | 10/2000 | Carlson et al. |
| 6,134,089 | A | 10/2000 | Barr et al. |
| 6,136,166 | A | 10/2000 | Shen et al. |

(Continued)

*Primary Examiner* — Tan X Dinh

(74) *Attorney, Agent, or Firm* — Convergent Law Group LLP

(57) ABSTRACT

A heat assisted magnetic recording (HAMR) writer is described. The HAMR writer is coupled with a laser and has an air-bearing surface (ABS) that resides near a media during use. The HAMR writer includes a waveguide, a near-field transducer (NFT), a main pole, coil(s) and at least one of a first and a second diffusion barrier layer. The waveguide is optically coupled with the laser and directs energy from the laser toward the ABS. The NFT is optically coupled with the waveguide and focuses the energy onto a region of the media. The main pole writes to the region of the media. The main pole has a top, a bottom, and a plurality of sides. The first diffusion barrier layer is between at least the NFT and the bottom of the pole. The second diffusion barrier layer is adjacent to the plurality of sides of the main pole.

20 Claims, 16 Drawing Sheets

(56) References Cited

U.S. PATENT DOCUMENTS

| | | |
|---|---|---|
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |

(56) References Cited

U.S. PATENT DOCUMENTS

| | | |
|---|---|---|
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,099,096 B2 | 8/2006 | Ueyanagi |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |

(56) References Cited

U.S. PATENT DOCUMENTS

| | | |
|---|---|---|
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,151 B2 | 1/2013 | Katine et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |

(56) References Cited

U.S. PATENT DOCUMENTS

| | | |
|---|---|---|
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,215 B2 | 3/2014 | Zou et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2010/0290157 A1 | 11/2010 | Zhang et al. |
| 2011/0086240 A1 | 4/2011 | Xiang et al. |
| 2012/0045662 A1* | 2/2012 | Zou et al. ............ 428/810 |
| 2012/0105996 A1* | 5/2012 | Katine et al. ............ 360/59 |
| 2012/0111826 A1 | 5/2012 | Chen et al. |
| 2012/0127839 A1* | 5/2012 | Rawat et al. ............ 369/13.33 |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0107679 A1 | 5/2013 | Huang et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0277863 A1* | 10/2013 | Zhong et al. ............ 257/779 |
| 2014/0050057 A1* | 2/2014 | Zou et al. ............ 369/13.33 |
| 2014/0050058 A1 | 2/2014 | Zou et al. |
| 2014/0154529 A1 | 6/2014 | Yang et al. |
| 2014/0175050 A1 | 6/2014 | Zhang et al. |
| 2014/0313872 A1* | 10/2014 | Rawat et al. ............ 369/13.33 |
| 2014/0355400 A1* | 12/2014 | Balamane et al. ............ 369/13.17 |

\* cited by examiner

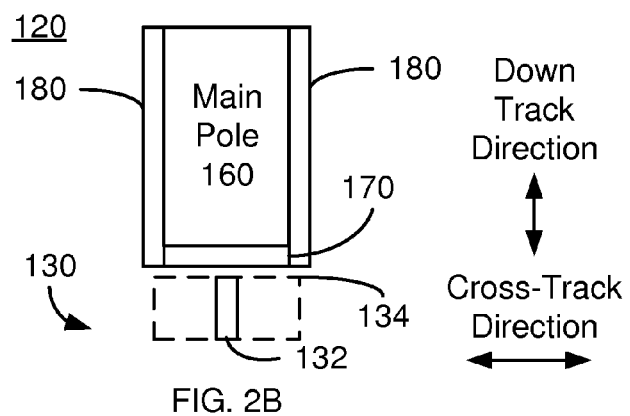
FIG. 2B
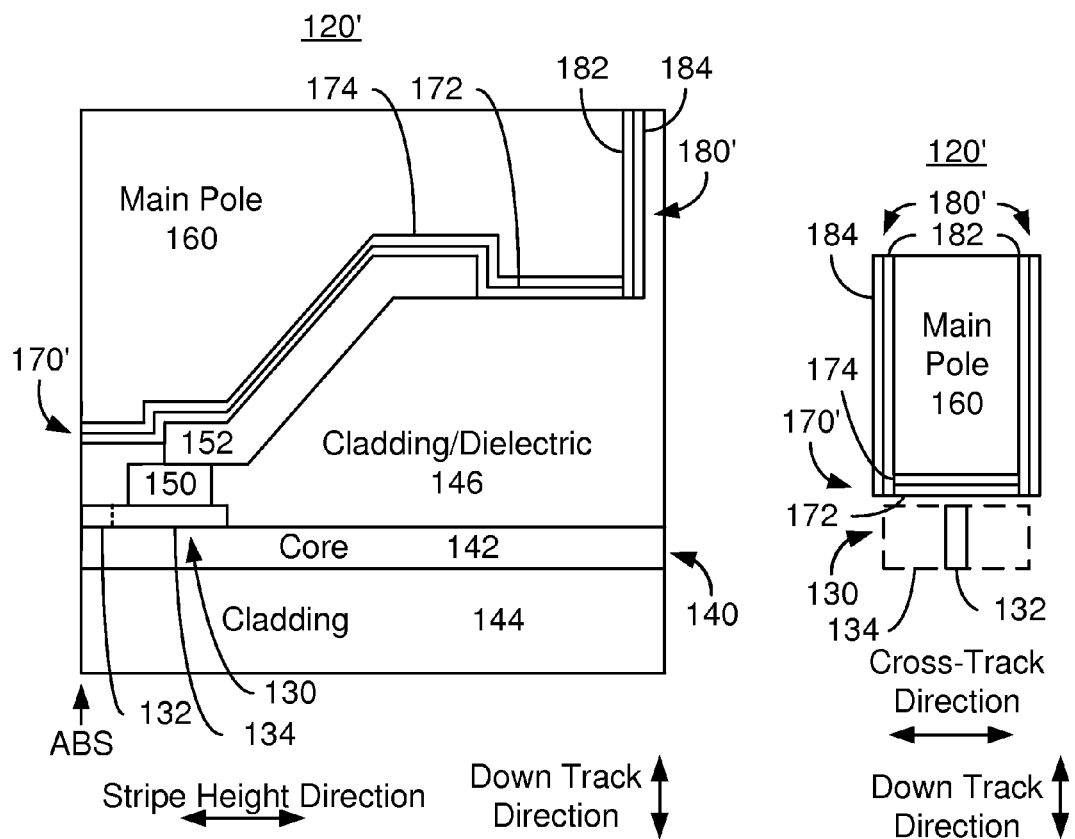
FIG. 3A
FIG. 3B

HEAT ASSISTED MAGNETIC RECORDING HEAD HAVING A PLURALITY OF DIFFUSION BARRIER LAYERS

BACKGROUND

A conventional heat assisted magnetic recording (HAMR) transducer typically includes at least a waveguide, a near-field transducer (NFT), a main pole and a coil for energizing the main pole. The conventional HAMR transducer uses light, or energy, received from a conventional laser in order to write to a magnetic recording media. Light from the laser is incident on and coupled into the waveguide. Light is guided by the conventional waveguide to the NFT 20 near the ABS. The NFT focuses the light to magnetic recording media (not shown), such as a disk. This region is thus heated. The main pole is energized and field from the pole tip is used to write to the heated portion of the recording media.

Although the conventional HAMR transducer functions, there are drawbacks. During use, the NFT and surrounding region, including the main pole tip and waveguide, may be subjected to very high temperatures. As a result, the structure and performance of the NFT, waveguide and/or write pole may be degraded. Performance and reliability of the conventional HAMR transducer may thus be adversely affected.

BRIEF DESCRIPTION OF SEVERAL VIEWS OF THE DRAWINGS

FIGS. 2A and 2B are diagrams depicting side and ABS views of an exemplary embodiment of a HAMR transducer.

FIGS. 3A and 3B are diagrams depicting side and ABS views of another exemplary embodiment of a HAMR transducer.

DETAILED DESCRIPTION OF THE PREFERRED EMBODIMENTS

Figure 1:
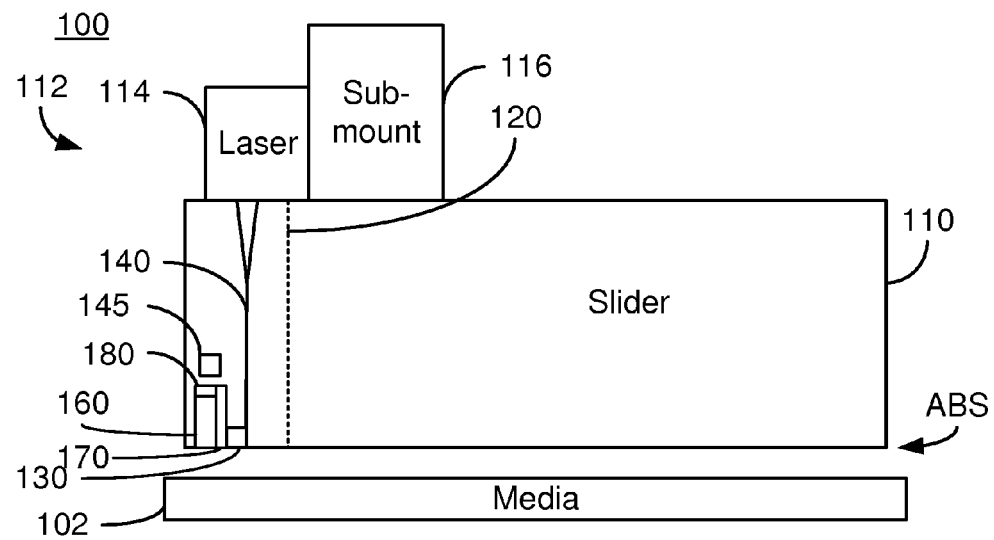
FIG. 1 is a diagram depicting a side view of an exemplary embodiment of a HAMR disk drive.

FIG. 1 depicts a side view of an exemplary embodiment of a portion of a heat-assisted magnetic recording (HAMR) disk drive 100. For clarity, FIG. 1 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components are shown. However, multiples of each component and their sub-components, might be used.

The HAMR disk drive 100 includes media 102, a slider 110, a laser subassembly 112 and a HAMR transducer 120. Additional and/or different components may be included in the HAMR disk drive 100. Although not shown, the slider 110, and thus the laser assembly 112 and HAMR transducer 120 are generally attached to a suspension (not shown). The laser assembly 112 includes a laser 114 and a submount 116. The submount 116 is a substrate to which the laser 114 may be affixed for improved mechanical stability, ease of manufacturing and better robustness. The laser 114 may be a chip such as a laser diode or other laser.

The HAMR transducer 120 is fabricated on the slider 110 and includes an air-bearing surface (ABS) proximate to the media 102 during use. In general, the HAMR write transducer 120 and a read transducer are present in the HAMR head. However, for clarity, only the HAMR write transducer 120 is shown. As can be seen in FIG. 1, HAMR transducer 120 includes a near-field transducer (NFT) 130, a waveguide 140, coil(s) 145, a main pole 160 and diffusion barrier layers 170 and 180. The waveguide 140 is optically coupled with the laser 114 and carries light energy from the laser 114 to the ABS. The NFT 130 couples a portion of this energy from the waveguide 140 to the media 102. In some embodiments, the NFT 130 occupies a portion of the ABS. The NFT 130 transfers energy to the media 102. The write pole 160 is energized by the coils 145 and writes to the media 102.

One or more diffusion barrier layers 170 and 180 may also be present. The diffusion barrier 170 is adjacent to the bottom of the main pole 160 and resides between the main pole 160 and the NFT 130. In some embodiments, the diffusion barrier 170 adjoins the bottom of the main pole 160. The diffusion barrier 180 resides adjacent to the sides of the main pole 160. In the embodiment shown, the diffusion barrier 180 is at least at the back of the main pole. In some embodiments, the diffusion barrier layer 180 is adjacent to the sides of the main pole 160. The diffusion barrier layer 180 may be adjacent to both the back and sides of the main pole 160. In some embodiments, the diffusion barrier 180 adjoins the sides and/or back of the main pole 160. Although the structures 170 and 180 are both diffusion barriers, the structures 170 and 180 may be configured to reduce or prevent diffusion of different materials. In some embodiments, diffusion barrier layers 170 and 180 are present. In other embodiments, one of the diffusion barrier layers 170 or 180 may be omitted.

The diffusion barrier layer 170 is desired to insulate the write pole 160 from diffusion of material(s) such as those in the NFT 130. The diffusion barrier layer 170 may also prevent or reduce diffusion of materials used in a heat sink and/or heat spreader (not shown in FIG. 1) that lie along the bottom of the main pole. Thus, the diffusion barrier layer 170 includes a barrier to diffusion of a gold-containing material. In some embodiments, the diffusion barrier layer 170 may be a multilayer. For example, the diffusion barrier layer 170 may include at least one of a W layer, a Ru layer, a Ta layer, a TaN layer, an indium oxide layer, a tungsten nitride layer, a titanium nitride layer, a titanium tungsten layer, a tungsten carbonitride layer, a tungsten disilicide layer, a titanium tungsten silicide layer and a Ni layer. The diffusion barrier layer 170 may have a thickness of at least five nanometers and not more than twelve nanometers. For example, the diffusion barrier layer 170 may consist of a ten nanometer W layer. Alternatively, a ten nanometer Ta layer may be used.

In contrast, the diffusion barrier layer 180 may include a barrier to diffusion of constituent(s) of the main pole 160. Thus, one or more materials in the main pole 160 may be prevented from diffusing to the surrounding dielectric. For example, the diffusion barrier layer 180 be a barrier to diffusion of Fe in the main pole 160. For example, the diffusion barrier layer 180 may include at least one of W and Ru. In some embodiments, the diffusion barrier layer 180 is a single layer. In other embodiments, the diffusion barrier layer 180 may be a multilayer including multiple sublayers. For example, the second diffusion barrier layer 180 may include a W sublayer and a Ru sublayer on the W sublayer. In some embodiments, the same material(s) may be used for the diffusion barrier layer 170 as the diffusion barrier layer 180. For example, W may be used for both structures 170 and 180.

The HAMR disk drive 100 may exhibit enhanced performance. More specifically, the presence of the diffusion barrier layer 170 and/or 180 may improve the HAMR transducer 100. The diffusion barrier layer 170 may prevent or reduce diffusion of portions of the NFT 130 or other analogous materials into the main pole 160. Similarly, the diffusion barrier layer 180 may prevent or reduce diffusion of portions of the main pole 160 into the surrounding structures. Thus, intermixing of the layers of the transducer 120 may be reduced. The desired properties of components of the transducer 120 may be maintained and failure of the components prevented. Thus, performance and reliability of the HAMR transducer 130 and the disk drive 100 may be enhanced.

Figure 2A:
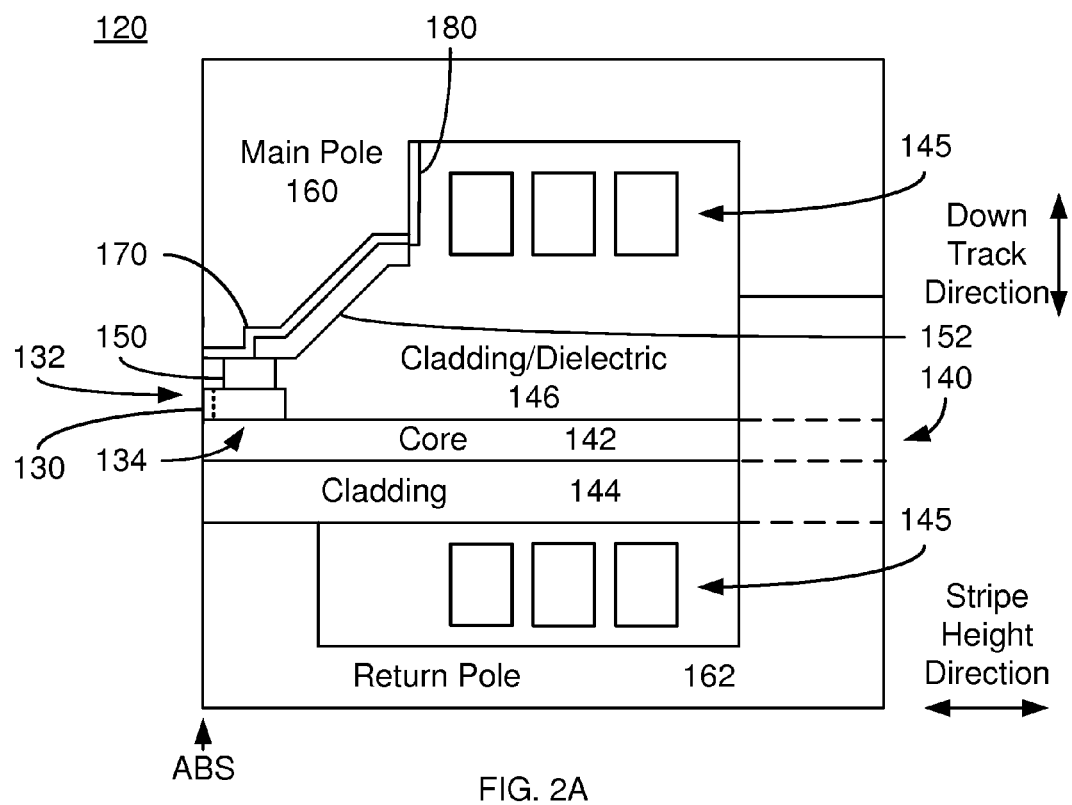

FIGS. 2A and 2B depict side and ABS views of an exemplary embodiment of a portion of the HAMR transducer 120 that is part of the disk drive 100. For clarity, FIGS. 2A and 2B are not to scale. For simplicity not all portions of the HAMR transducer 120 are shown. In addition, although the HAMR transducer 120 is depicted in the context of particular components other and/or different components may be used. Further, the arrangement of components may vary in different embodiments. The HAMR transducer 120 may be used in the HAMR disk drive 100. Consequently, similar components have analogous labels. In addition, the HAMR transducer 120 is discussed in the context of the disk drive 100.

The HAMR transducer 120 includes NFT 130, waveguide 140, write pole 160, return pole 162 and coils 145. The coil(s) 145 may be spiral, or pancake, coils. In other embodiments, the coil(s) 145 may be solenoidal. The coil(s) 145 may be used to energize the write pole 140 during writing.

The waveguide 140 directs energy from the laser 114 to the ABS. The waveguide 140 includes cladding 144 and 146 as well as core 142. The NFT 130 is optically coupled with the waveguide 140 and receives energy from the core 142. The NFT 130 is proximate to the ABS. For example, the NFT 130 is shown as having a surface occupying a portion of the ABS. The NFT 130 is depicted as including a pin 132 and a disk 134. The pin 132 is between the disk 134 and the ABS. The disk 134 is recessed from the ABS and thus is shown by a dashed line in the ABS view of FIG. 3B. The pin 132 is also relatively short. Consequently, the disk 134 may be recessed from the ABS by not more than fifty nanometers. Although termed a disk, the disk 134 of the NFT 130 need not be disk-shaped. For example, instead of having a circular footprint, the disk 134 may be square, rectangular, or have another shape.

The write pole 160 is configured to write to the region of the media heated by the NFT 130. In some embodiments, the write pole 160 does not extend more than across the disk 134 of the NFT in the track width direction in the pole tip region. Thus, for example, the width of the write pole 160 in the track width direction at the ABS may be less than two hundred nanometers.

In the embodiment shown, a heat sink 150 and heat spreader 152 are also included in the transducer 120. In alternate embodiment, one or both structures 150 and/or 152 may be omitted. The heat sink 150 is thermally coupled with the NFT 130 and the main pole 160. The heat spreader 152 may also be thermally connected with the NFT 130 and the main pole 160. The heat sink 150 and heat spreader 152 may be used in thermal management for the transducer 120. Thus, the heat sink 150 and heat spreader 152 are desired to have a high thermal conductivity. For example, a material such as gold or a gold alloy may be used for the heat sink 150 and/or the heat spreader 152. The materials used for the heat sink 150 and heat spreader 152 may be similar to materials used in the NFT 130. The heat sink 150 and heat spreader 152 may be used to conduct heat from the NFT 130 and allow for heat dissipation over a wider area of the HAMR transducer 120.

Diffusion barrier layers 170 and 180 are also shown in FIGS. 2A and 2B. The diffusion barrier layer 170 resides between the NFT 130 and the main pole 160. More specifically, the diffusion barrier layer 170 is between the main pole 160 and both the heat sink 150 and heat spreader 152. The diffusion barrier layer 170 adjoins the bottom of the main pole 170. The diffusion barrier layer 170 is desired to insulate the write pole 160 from diffusion of material(s) in the NFT 130, heat sink 150 and heat spreader 152. Thus, the diffusion barrier layer 170 includes a barrier to diffusion of a gold-containing material. For example, the diffusion barrier layer 170 may include at least one of a W layer, a Ru layer, a Ta layer, a TaN layer, an indium oxide layer, a tungsten nitride layer, a titanium nitride layer, a titanium tungsten layer, a tungsten carbonitride layer, a tungsten disilicide layer, a titanium tungsten silicide layer and a Ni layer. The diffusion barrier layer 170 may have a thickness sufficient to prevent diffusion of material(s) such as Au used in the structures 130, 150 and/or 152 into the main pole.

The diffusion barrier layer 180 resides on the back and sides of the main pole 160, as shown in FIGS. 2A (back) and 2B (sides). The diffusion barrier layer 180 may include a barrier to diffusion of constituent(s) of the main pole 160. For example, the diffusion barrier layer 180 be a barrier to diffusion of Fe in the main pole 160. In addition, another barrier, such as an oxygen diffusion barrier, may be included in the diffusion barrier layer 180. The diffusion barrier layer 180 may include at least one of W and Ru. In the embodiment shown, the diffusion barrier layer 180 is a single layer. In some embodiments, the same material(s) may be used for the diffusion barrier layer 170 as the diffusion barrier layer 180. For example, W may be used for both structures 170 and 180.

In some embodiments, the diffusion barrier layer(s) 170 and/or 180 may be configured to reduce or prevent corrosion, particularly corrosion that is galvanic in nature. For example, the barrier layer 170 and/or 180 may be a dielectric layer or include a dielectric layer. Such a dielectric layer may be on the order of at least five and not more than ten nanometers. For example, metal oxides such as $Ta_2O_5$, $Nb_2O_5$ and/or $V_2O_5$ might be used. In other embodiments, multilayers of different oxide stacks, ternary oxides, combinations of oxides and metals or conductive metal nitrides and/or silicides such as TaN, TiN, and/or WSi$_2$ might be used. Insertion of such a dielectric layer may break or inhibit galvanic coupling that may be a source of corrosion. Corrosion of the main pole 160 may thus be reduced or eliminated. If the diffusion barrier layers are so configured, the diffusion barrier layers 170 and/or 180 may be considered to be corrosion barrier layers. In embodiments in which the layers 170 and/or 180 are multilayers, the layers in the multilayer may have different functions. For example, one layer might be a metallic diffusion barrier layer, while another layer may be a corrosion barrier layer. In other embodiments, a single dielectric may perform the dual functions of a diffusion barrier and a corrosion barrier. Thus, the diffusion barrier layers 170 and/or 180 may be both diffusion barriers and corrosion barriers in some embodiments.

The HAMR transducer 120 may exhibit enhanced performance due to the presence of the diffusion barrier layer 170 and/or 180. The diffusion barrier layer 170 may prevent or reduce diffusion of portions of the NFT 130, heat sink 150 and/or heat spreader 152 or other analogous materials into the main pole 160. Similarly, the diffusion barrier layer 180 may prevent or reduce diffusion of portions of the main pole 160 into the surrounding structures such as the dielectric 146. Thus, intermixing of the layers of the transducer 120 may be reduced. Thus, performance and reliability of the HAMR transducer 120 and the disk drive 100 may be enhanced. In some embodiments, corrosion of the pole may also be reduced by the diffusion barrier layer(s) 170 and/or 180.

FIGS. 3A and 3B depict side and ABS views of an exemplary embodiment of a portion of the HAMR transducer 120' that may be part of the disk drive 100. For clarity, FIGS. 3A and 3B are not to scale. For simplicity not all portions of the HAMR transducer 120' are shown. In addition, although the HAMR transducer 120' is depicted in the context of particular components other and/or different components may be used. Further, the arrangement of components may vary in different embodiments. The HAMR transducer 120' is analogous to the HAMR transducer 120. Consequently, similar components have analogous labels. The HAMR transducer 120' thus includes an NFT 130 including a disk 134 and a pin 130, a waveguide 140 including cladding 144 and 146 and core 142, heat sink 150, heat spreader 152, main pole 160, diffusion barrier layer 170' and diffusion barrier layer 180' that are analogous to the NFT 130 having the disk 134 and the pin 130, the waveguide 140 including cladding 144 and 146 and core 142, the heat sink 150, the heat spreader 152, the main pole 160, the diffusion barrier layer 170 and the diffusion barrier layer 180, respectively. The structure and function of the components in the transducer 120' are thus analogous to those of the transducer 120. In addition, for clarity, some components of the transducer 120' are not shown. For example, coils and the return pole depicted in FIG. 2A are not shown in FIG. 3A. However, such structures may be present.

In the embodiment shown in FIGS. 3A and 3B, the diffusion barrier layer 170' is a multilayer. Thus, sublayers 172 and 174 are shown. Each of the sublayers 172 and 174 may be a barrier layer. In some embodiments, each of the sublayers 172 and 174 is a barrier to gold diffusion. In other embodiments, one sublayer 172 or 174 may be a barrier to gold diffusion while the other sublayer 174 or 172, respectively, may have another purpose. This purpose may include functioning as a barrier to diffusion of another material and/or acting as a seed layer. Similarly, the diffusion barrier layer 180' is a multilayer. The diffusion barrier layer 180' includes sublayers 182 and 184. In some embodiments, each of the sublayers 182 and 184 is a barrier to diffusion of pole material(s) such as Fe. In other embodiments, one sublayer 182 or 184 may be a barrier to pole material diffusion while the other sublayer 174 or 172, respectively, may have another purpose. For example, the layer 182 may be a W layer and the layer 184 may be a Ru layer. In another embodiment, other configurations may be possible.

The HAMR transducer 120' may share the benefits of the transducer 120. For example, the presence of the diffusion barrier layer(s) 170' and/or 180' may prevent or reduce diffusion of constituents of the HAMR transducer 120'. Thus, intermixing of the layers of the transducer 120' may be reduced. Thus, performance and reliability of the HAMR transducer 120' and the disk drive 100 may be enhanced. In addition, the layer 174 and/or 184 may be a corrosion barrier layer while the layer 172 and/or 182 may be a diffusion barrier layer. Thus, the diffusion barrier layer(s) 170' and/or 180' may function as both a diffusion barrier and a corrosion barrier.

Figure 4A:
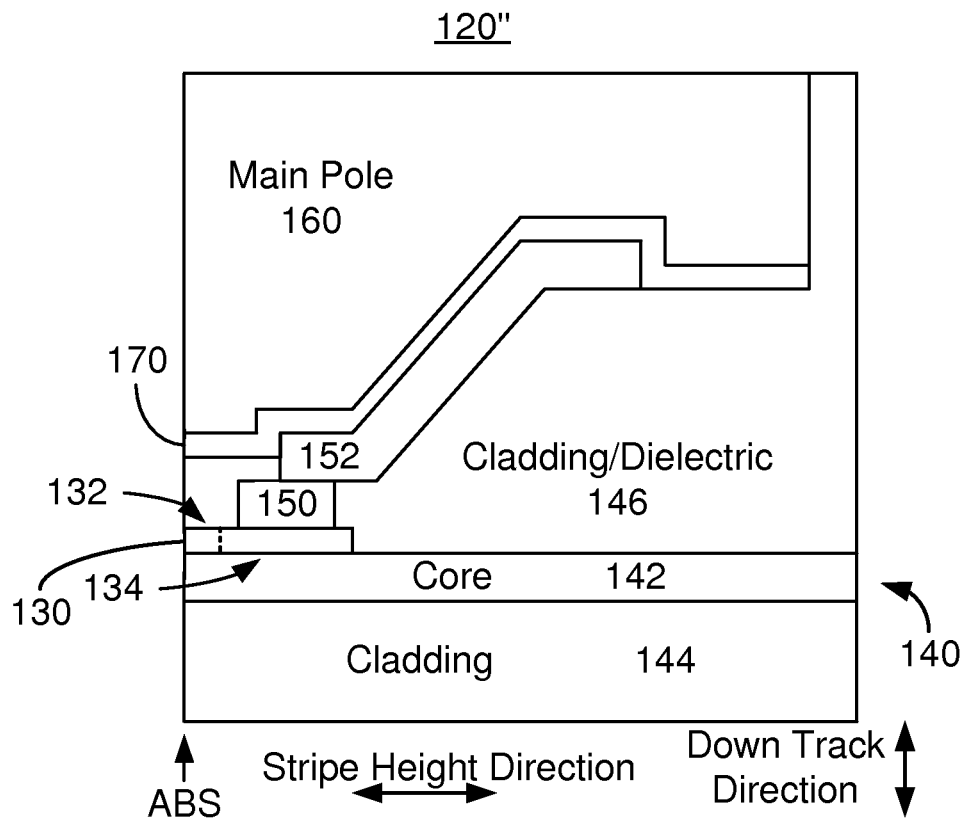
FIGS. 4A and 4B are diagrams depicting side and ABS views of another exemplary embodiment of a HAMR transducer.
Figure 4B:
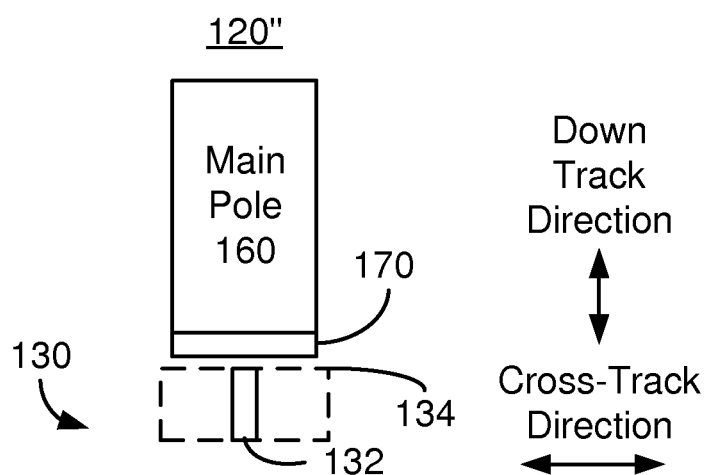

FIGS. 4A and 4B depict side and ABS views of an exemplary embodiment of a portion of the HAMR transducer 120" that may be part of the disk drive 100. For clarity, FIGS. 4A and 4B are not to scale. For simplicity not all portions of the HAMR transducer 120" are shown. In addition, although the HAMR transducer 120" is depicted in the context of particular components other and/or different components may be used. Further, the arrangement of components may vary in different embodiments. The HAMR transducer 120" is analogous to the HAMR transducer 120 and/or 120'. Consequently, similar components have analogous labels. The HAMR transducer 120" thus includes an NFT 130 including a disk 134 and a pin 130, a waveguide 140 including cladding 144 and 146 and core 142, heat sink 150, heat spreader 152, main pole 160 and diffusion barrier layer 170 that are analogous to the NFT 130 having the disk 134 and the pin 130, the waveguide 140 including cladding 144 and 146 and core 142, the heat sink 150, the heat spreader 152, the main pole 160 and the diffusion barrier layer 170. The structure and function of the components in the transducer 120" are thus analogous to those of the transducer 120 and/or 120'. In addition, for clarity, some components of the transducer 120" are not shown. For example, coils and the return pole depicted in FIG. 2A are not shown in FIG. 4A. However, such structures may be present.

In the embodiment shown in FIGS. 4A and 4B, the diffusion barrier layer 170 is present. Thus, the layer 170 is a barrier to gold diffusion. The diffusion barrier layer 170 is depicted as a single layer. In other embodiments, a multilayer may be used. However, the diffusion barrier layer 180/180' has been omitted.

The HAMR transducer 120" may share at least some of the benefits of the transducer(s) 120 and/or 120. The presence of the diffusion barrier layer 170 may prevent or reduce diffusion of constituents of the HAMR transducer 120". For example, diffusion of constituents of the heat spreader 152, heat sink 150, and/or NFT 130 into the pole may be reduced or eliminated. Thus, intermixing of the layers of the transducer 120" may be reduced. Thus, performance and reliability of the HAMR transducer 120" and the disk drive 100 may be enhanced.

Figure 5A:
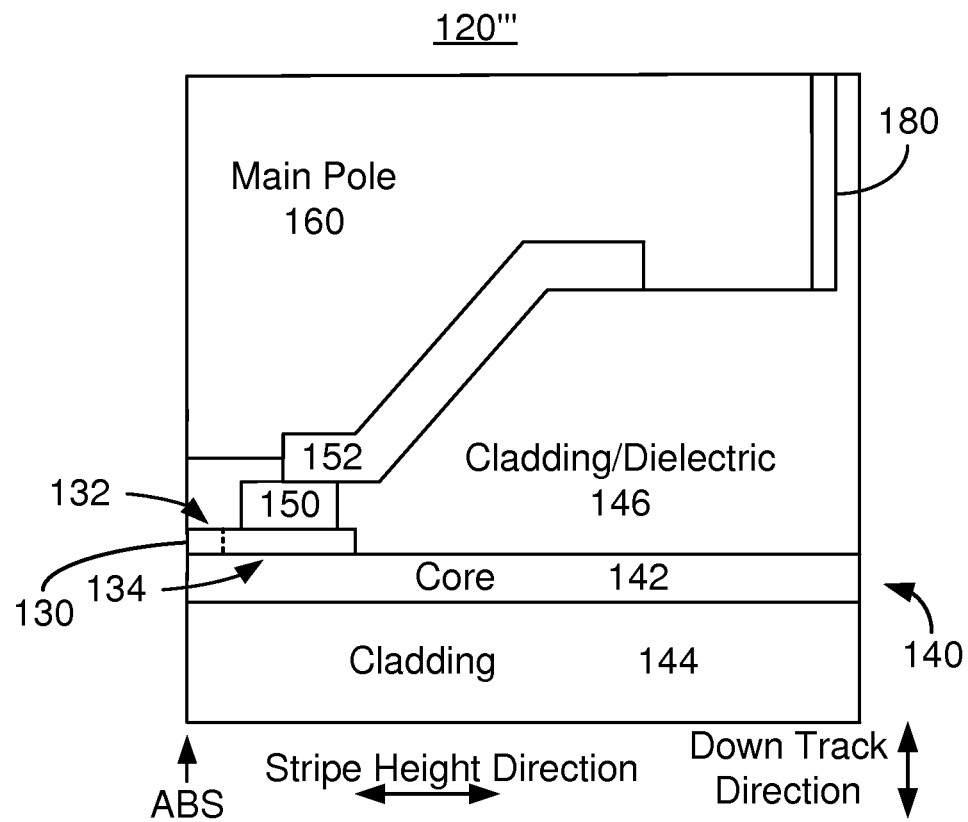
FIGS. 5A and 5B are diagrams depicting side and ABS views of another exemplary embodiment of a HAMR transducer.
Figure 5B:
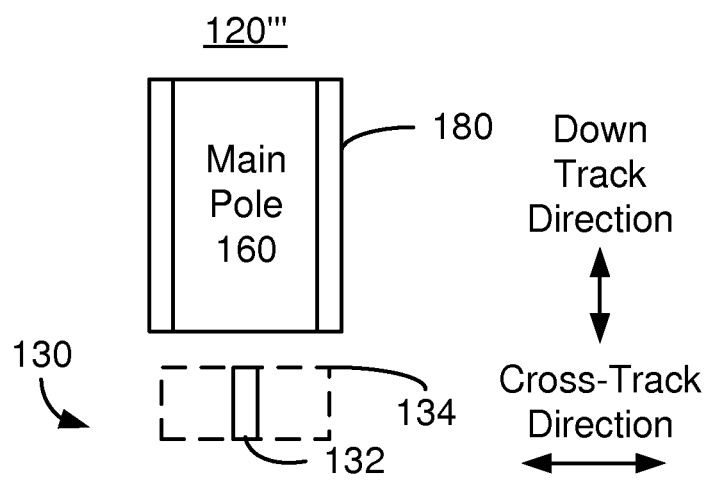

FIGS. 5A and 5B depict side and ABS views of an exemplary embodiment of a portion of the HAMR transducer 120'" that may be part of the disk drive 100. For clarity, FIGS. 5A and 5B are not to scale. For simplicity not all portions of the HAMR transducer 120'" are shown. In addition, although the HAMR transducer 120''; is depicted in the context of particular components other and/or different components may be used. Further, the arrangement of components may vary in different embodiments. The HAMR transducer 120''' is analogous to the HAMR transducer 120, 120' and/or 120''. Consequently, similar components have analogous labels. The HAMR transducer 120''' thus includes an NFT 130 including a disk 134 and a pin 130, a waveguide 140 including cladding 144 and 146 and core 142, heat sink 150, heat spreader 152, main pole 160 and diffusion barrier layer 180 that are analogous to the NFT 130 having the disk 134 and the pin 130, the waveguide 140 including cladding 144 and 146 and core 142, the heat sink 150, the heat spreader 152, the main pole 160 and the diffusion barrier layer 180. The structure and function of the components in the transducer 120''' are thus analogous to those of the transducer 120, 120' and/or 120''. In addition, for clarity, some components of the transducer 120'''' are not shown. For example, coils and the return pole depicted in FIG. 2A are not shown in FIG. 5A. However, such structures may be present.

In the embodiment shown in FIGS. 5A and 5B, the diffusion barrier layer 180 is present. However, the diffusion barrier layer 170/170' has been omitted. Thus, the diffusion barrier layer 180 is a barrier to diffusion of one or more material(s) in the pole 160. For example, in one embodiment, the diffusion barrier layer 180 is an Fe diffusion barrier. In some embodiments, the diffusion barrier layer 180 may also include a barrier to oxygen diffusion. Although depicted as a single layer, in some embodiments, the diffusion barrier layer 180 may be a multilayer.

The HAMR transducer 120''' may share at least some of the benefits of the transducer(s) 120, 120' and/or 120''. The presence of the diffusion barrier layer 180 may prevent or reduce diffusion of constituents of the HAMR transducer 120'''. For example, diffusion of material(s) in the main pole 160 such as Fe, into the dielectric 146 may be reduced or eliminated. Thus, intermixing of the layers of the transducer 120''' may be reduced. Thus, performance and reliability of the HAMR transducer 120''' and the disk drive 100 may be enhanced.

Figure 6A:
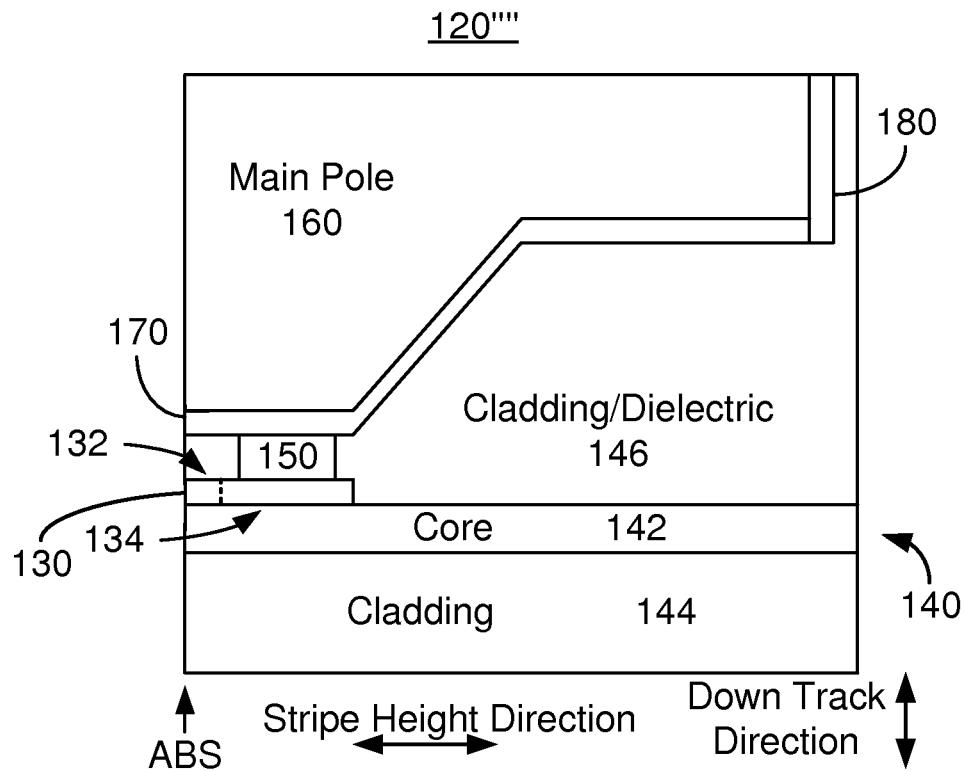
FIGS. 6A and 6B are diagrams depicting side and ABS views of another exemplary embodiment of a HAMR transducer.
Figure 6B:
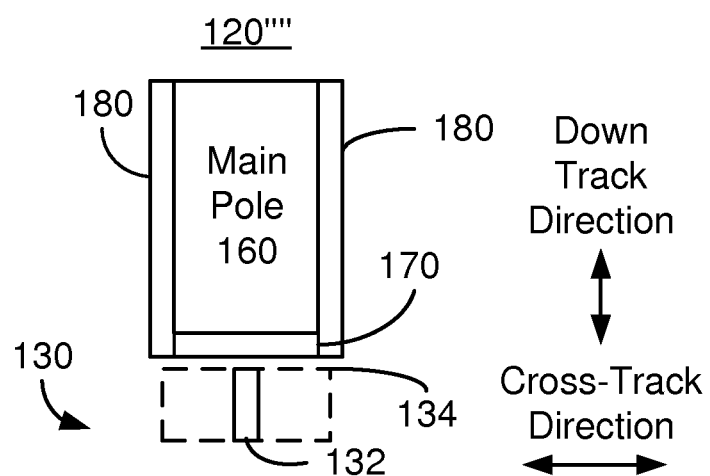

FIGS. 6A and 6B depict side and ABS views of an exemplary embodiment of a portion of the HAMR transducer 120'''' that may be part of the disk drive 100. For clarity, FIGS. 6A and 6B are not to scale. For simplicity not all portions of the HAMR transducer 120'''' are shown. In addition, although the HAMR transducer 120'''' is depicted in the context of particular components other and/or different components may be used. Further, the arrangement of components may vary in different embodiments. The HAMR transducer 120'''' is analogous to the HAMR transducer 120, 120', 120'' and/or 120'''. Consequently, similar components have analogous labels. The HAMR transducer 120'''' thus includes an NFT 130 including a disk 134 and a pin 130, a waveguide 140 including cladding 144 and 146 and core 142, heat sink 150, main pole 160, diffusion barrier layer 170 and diffusion barrier layer 180 that are analogous to the NFT 130 having the disk 134 and the pin 130, the waveguide 140 including cladding 144 and 146 and core 142, the heat sink 150, the main pole 160, the diffusion barrier layer 170/170' and the diffusion barrier layer 180/180', respectively. The structure and function of the components in the transducer 120'''' are thus analogous to that in the transducer 120/120'/120''/120'''. In addition, for clarity, some components of the transducer 120'''' are not shown. For example, coils and the return pole depicted in FIG. 2A are not shown. However, such structures may be present.

In the embodiment shown in FIGS. 6A and 6B, the heat spreader has been omitted. The diffusion barrier layer 170 is depicted as a single layer. In other embodiments, a multilayer may be used. The diffusion barrier layer 170 is a barrier to gold diffusion. However, a portion of the diffusion barrier layer 170 is between the main pole 160 and the cladding 146. Thus, the diffusion barrier layer 170 may also be desired to function as a diffusion barrier for material(s) in the main pole 160. For example, the diffusion barrier layer 170 may be desired to be a barrier to diffusion of Fe. Thus, the materials described above that are suitable for use in both the structures 170 and 180 may be used in the diffusion barrier layer 170. For example, the diffusion barrier layer 170 may be a W layer. Similarly, the diffusion barrier layer 180 is also a single layer. In other embodiments, the diffusion barrier layer 180 may be a multilayer. In another embodiment, other configurations may be possible.

The HAMR transducer 120'''' may share the benefits of the transducers 120, 120', 120'' and/or 120'''. For example, the presence of the diffusion barrier layer(s) 170 and/or 180 may prevent or reduce diffusion of constituents of the HAMR transducer 120''''. Thus, intermixing of the layers of the transducer 120'''' may be reduced. Thus, performance and reliability of the HAMR transducer 120'''' and the disk drive 100 may be enhanced.

Figure 7A:
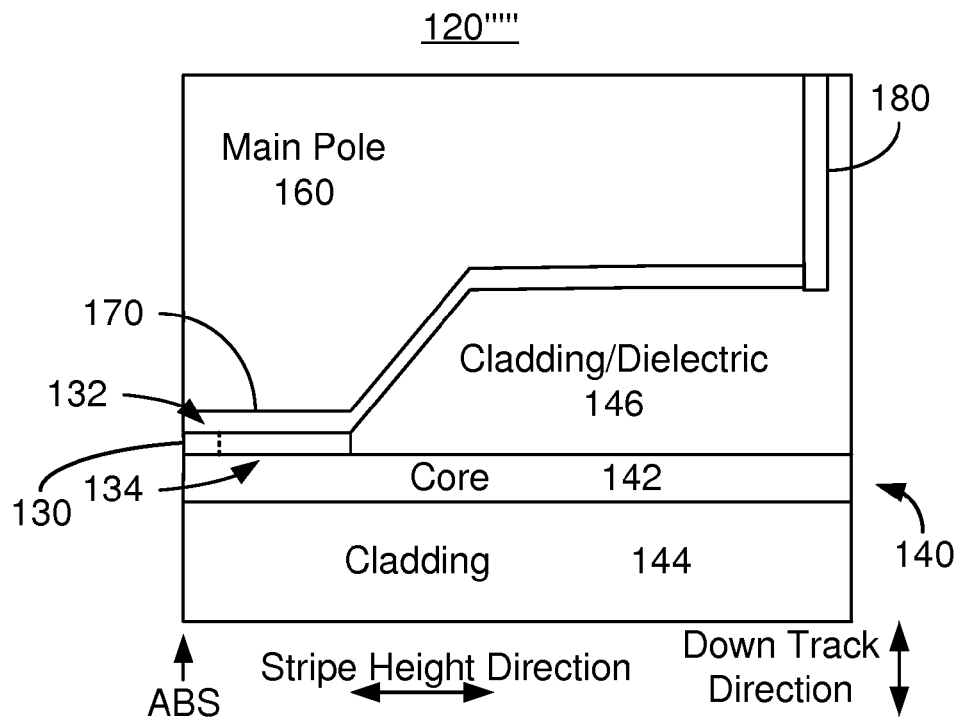
FIGS. 7A and 7B are diagrams depicting side and ABS views of another exemplary embodiment of a HAMR transducer.
Figure 7B:
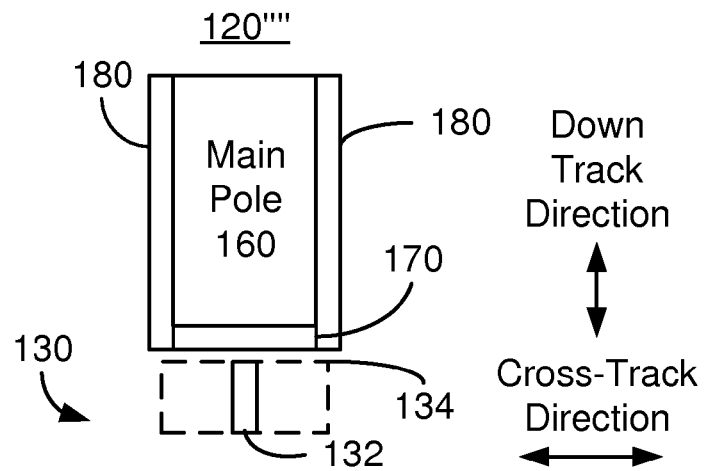

FIGS. 7A and 7B depict side and ABS views of an exemplary embodiment of a portion of the HAMR transducer 120''''' that may be part of the disk drive 100. For clarity, FIGS. 7A and 7B are not to scale. For simplicity not all portions of the HAMR transducer 120''''' are shown. In addition, although the HAMR transducer 120''''' is depicted in the context of particular components other and/or different components may be used. Further, the arrangement of components may vary in different embodiments. The HAMR transducer 120''''' is analogous to the HAMR transducer 120, 120', 120'', 120''' and/or 120''''. Consequently, similar components have analogous labels. The HAMR transducer 120''''' thus includes an NFT 130 including a disk 134 and a pin 130, a waveguide 140 including cladding 144 and 146 and core 142, main pole 160, diffusion barrier layer 170 and diffusion barrier layer 180 that are analogous to the NFT 130 having the disk 134 and the pin 130, the waveguide 140 including cladding 144 and 146 and core 142, the main pole 160, the diffusion barrier layer 170/170' and the diffusion barrier layer 180/180', respectively. The structure and function of the components in the transducer 120''''' are thus analogous to that in the transducer 120/120'/120''/120'''120''''. In addition, for clarity, some components of the transducer 120''''' are not shown. For example, coils and the return pole depicted in FIG. 2A are not shown. However, such structures may be present.

In the embodiment shown in FIGS. 7A and 7B, the heat spreader and the heat sink have been omitted. The diffusion barrier layer 170 may thus be in physical contact with the NFT 130 and the main pole 160. The diffusion barrier layer 170 is depicted as a single layer. In other embodiments, a multilayer may be used. The diffusion barrier layer 170 is a barrier to diffusion of material(s) in the NFT 130 such as gold. However, a portion of the diffusion barrier layer 170 is between the main pole 160 and the cladding 146. Thus, the diffusion barrier layer 170 may also be desired to function as a diffusion barrier for material(s) in the main pole 160. For example, the diffusion barrier layer 170 may also be desired to be a barrier to diffusion of Fe, Ni and Co. Thus, the materials described above that are suitable for use in both the structures 170 and 180 may be used in the diffusion barrier layer 170. For example, the diffusion barrier layer 170 may be a W layer. Similarly, the diffusion barrier layer 180 is also a single layer. In other embodiments, the diffusion barrier layer 180 may be a multilayer. In another embodiment, other configurations may be possible.

The HAMR transducer 120'''' may share the benefits of the transducers 120, 120', 120'', 120''' and/or 120''''. For example, the presence of the diffusion barrier layer(s) 170 and/or 180 may prevent or reduce diffusion of constituents of the HAMR transducer 120''''. Thus, intermixing of the layers of the transducer 120'''' may be reduced. Thus, performance and reliability of the HAMR transducer 120'''' and the disk drive 100 may be enhanced. Various configurations of the HAMR transducer, including diffusion barrier layers have been described herein. In other embodiments, one or more features of the transducers 120, 120', 120'', 120''', 120'''' and/or 120''''' may be combined.

Figure 8:
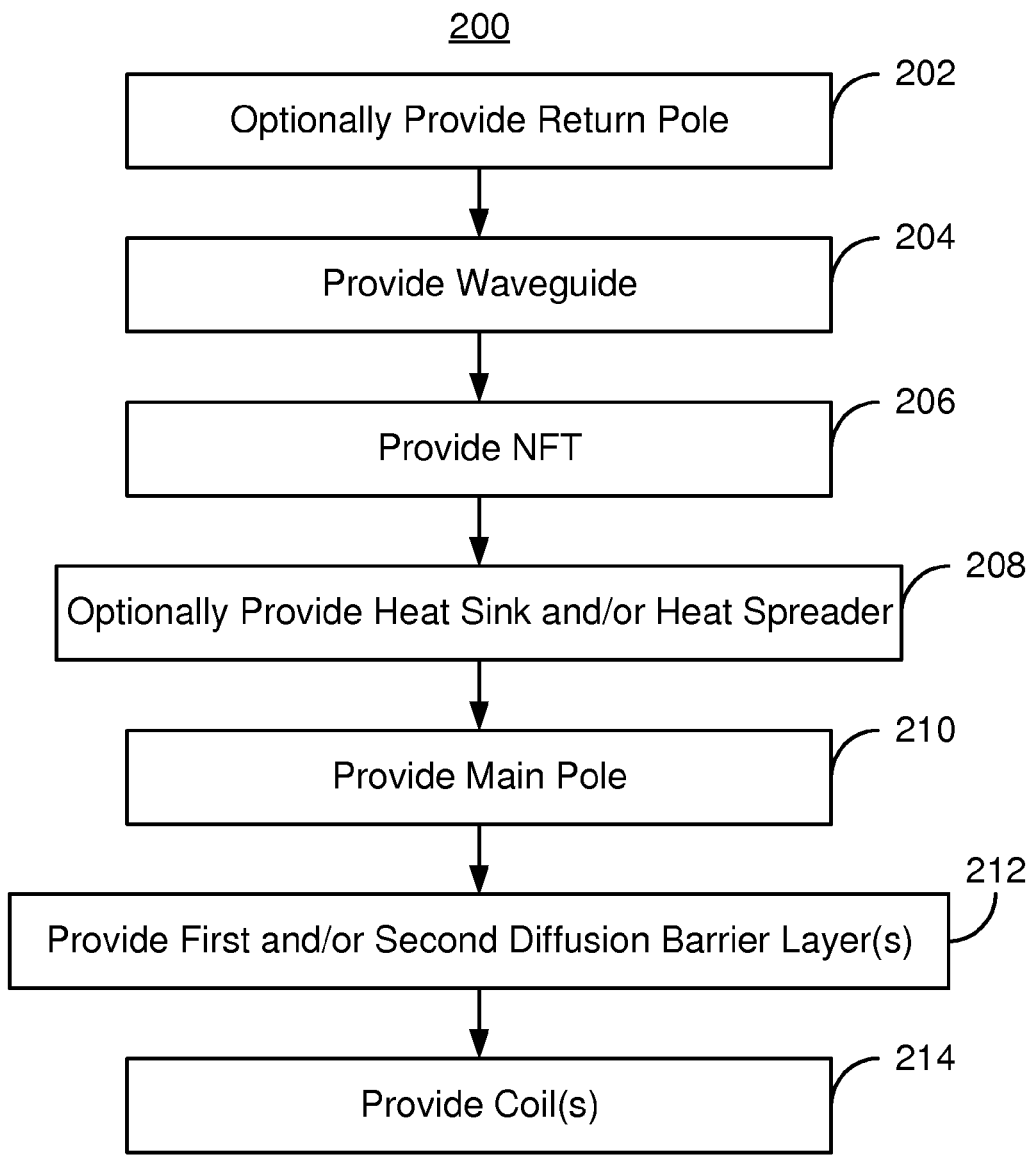
FIG. 8 is a flow chart depicting an exemplary embodiment of a method for fabricating a HAMR write transducer.

FIG. 8 is a flow chart depicting an exemplary embodiment of a method 200 for fabricating a HAMR write transducer. The method 200 may be used in fabricating transducers such as the transducers 120, 120', 120'', 120''', 120'''' and/or 120''''', though other transducers might be so fabricated. For clarity, the method 200 is described in the context of the transducer 120 depicted in FIGS. 1, 2A and 2B. For simplicity, some steps may be omitted, performed in another order, interleaved and/or combined. The magnetic recording transducer being fabricated may be part of a merged head that also includes a read head (not shown) and resides on a slider (not shown) in a disk drive. The method 200 is also described in the context of providing a single magnetic recording transducer. However, the method 200 may be used to fabricate multiple transducers at substantially the same time. The method 200 and system are also described in the context of particular layers. However, in some embodiments, such layers may include multiple sub-layers. The method 200 also may commence after formation of other portions of the transducer.

The return pole 162 is optionally provided, via step 202. In some embodiments, step 202 includes forming the pedestal at the ABS for the return pole 162. An insulator may also be provided on the first pole. The waveguide 140 may be provided, via step 204. Step 204 generally includes forming cladding layers surrounding a core layer. The NFT 130 may be provided, via step 206. The NFT 130 is typically a metal disk 134 as well as a pin 132. Step 206 may thus include multiple substeps. For example, the material(s) for the disk 134 and/or pin 132 may be deposited, a mask covering the portions of the material(s) corresponding to the NFT 130 provided and the exposed portions of the material(s) may be lifted off. In other embodiments, a lift-of process may be used for forming the disk 134 and/or the pin 132.

The heat sink 150 and/or heat spreader 152 are optionally provided, via step 208. Step 208 may include depositing and patterning high thermal conductivity material(s), such as Au. The main pole 160 is provided, via step 210. Step 210 typically includes multiple deposition, masking and removal steps. Formation of the leading surface, leading and/or trailing bevels, an NFT-facing surface parallel to the top of the NFT, the ABS-facing surface and/or other features of the main pole 160 may also be completed as part of step 210.

One or both of the diffusion barrier layers 170/170' and/or 180/180' are formed, via step 212. Formation of the diffusion barrier layer 170/170' in step 212 may occur before formation of the main pole 160 in step 210. Thus, at least part of step 212 may be interleaved with or occur before at least part of step 212. The diffusion barrier 180/180' may be formed before or after formation of the main pole 160. For example, the diffusion barrier 180/180' may be deposited in a trench and the main pole provided in the trench. Alternatively, at least part of the main pole 160 may be formed first and the diffusion barrier layer 180/180' provided on the main pole 160.

The coil(s) 145 may be provided, via step 214. Step 214 may include multiple depositing and patterning steps such that the turns on both sides of the main pole 160 are fabricated. The shield 192 may also be fabricated, via step 216. Step 216 may include manufacturing the pedestal 193. Fabrication of the transducer may then be completed, via step 218.

Using the method 200, the HAMR transducer 120, 120', 120'', 120''', 120'''' and/or 120''''' may be fabricated. The benefit(s) of one or more of the HAMR transducer(s) 120, 120', 120'', 120''', 120'''' and/or 120''''' may thus be achieved.

Figure 9:
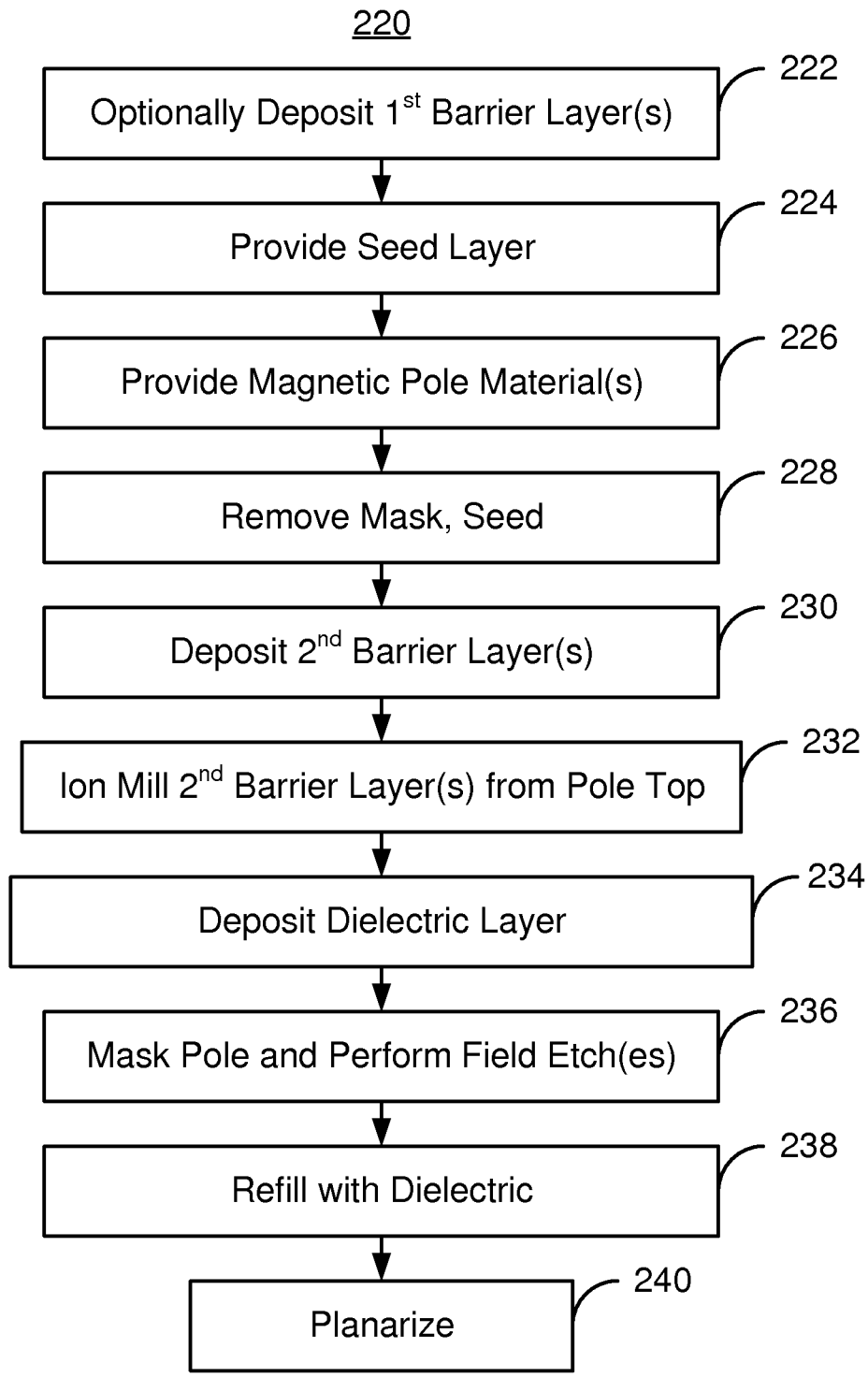
FIG. 9 is a flow chart depicting an exemplary embodiment of a method for fabricating a main pole and a diffusion barrier layer of a HAMR write transducer.

FIG. 9 is a flow chart depicting an exemplary embodiment of a method 220 for fabricating a main pole and diffusion barrier layer of a HAMR write transducer FIGS. 10-18 are diagrams depicting side views of another exemplary embodiment of a HAMR transducer 300 during fabrication using the method 220. For clarity, FIGS. 10-18 are not to scale. Further, although FIGS. 10-18 depict the ABS location (location at which the ABS is to be formed) and the ABS at a particular point in the pole, other embodiments may have other locations for the ABS. Further, the transducer 300 extends beyond the ABS location in FIGS. 10-18 because the device has not yet been lapped to the ABS. Referring to FIGS. 8-18, the method 220 is described in the context of the HAMR transducer 300. However, the method 220 may be used to form another device (not shown). The HAMR transducer 300 being fabricated may be part of a merged head that also includes a read head (not shown in FIGS. 9-18), a laser (not shown in FIGS. 9-18) and resides on a slider (not shown) in a disk drive. In addition, other portions of the HAMR transducer 300, such as the return pole, shield(s) and coil(s) are not shown for clarity. The method 220 also may commence after formation of other portions of the HAMR transducer 300. For example, a tantalum oxide core for the waveguide may have been formed. The method 220 is also described in the context of providing a single HAMR transducer 300 and a single composite NFT in the HAMR transducer 300. However, the method 220 may be used to fabricate multiple transducers and/or multiple heat sinks per transducer at substantially the same time. The method 220 and device 300 are also described in the context of particular layers. However, in some embodiments, such layers may include multiple sublayers.

The layer(s) for the first barrier layer are deposited, via step 222. Step 222 is optional and performed only if a bottom barrier layer, such as the barrier layer 170/170' depicted in FIGS. 1-3B, is to be provided. Referring back to FIGS. 9-18, the barrier layer deposited in step 222 may be a barrier to gold and/or other material(s) that may diffuse from the NFT, heat sink and/or heat spreader. Step 222 may include depositing a desired thickness of one or more of W, Ru, Ta, TaN, indium oxide, tungsten nitride, titanium nitride, titanium tungsten, tungsten carbonitride, tungsten disilicide, titanium tungsten silicide and Ni. For example, in one embodiment, four nanometers of W may be deposited in step 222.

Figure 10:
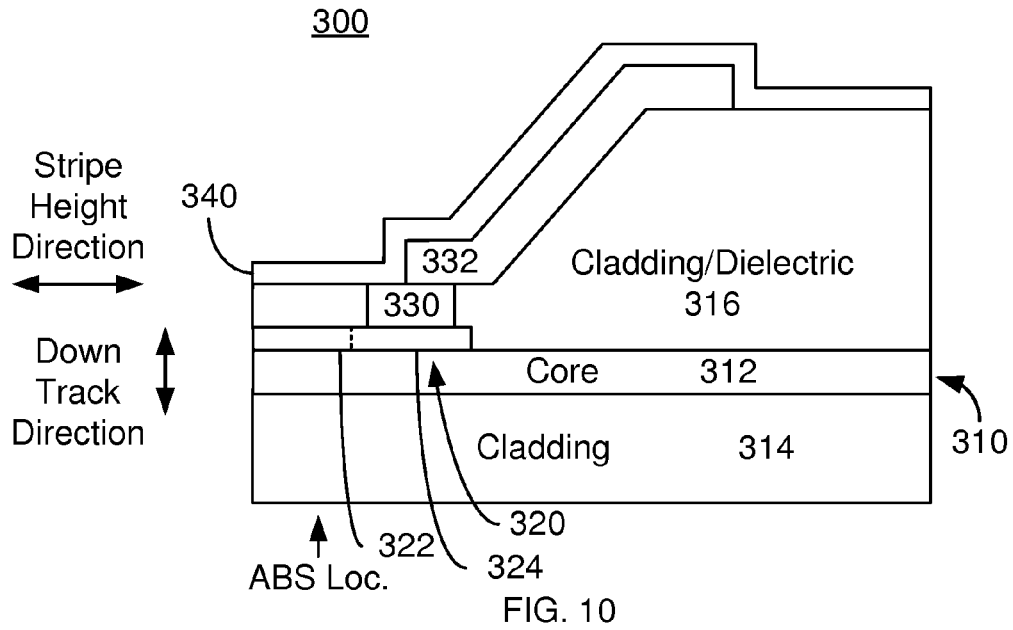
FIGS. 10-18 are diagrams depicting side views of another exemplary embodiment of a HAMR transducer during fabrication using the method described herein.

FIG. 10 depicts the transducer 300 after step 222 is performed. The transducer 300 includes a waveguide 310, NFT 320, heat sink 330 and head spreader 332 that have already been at least partially fabricated. The waveguide 310 includes cladding layers 314 and 316 and core 312. The NFT 320 includes a disk 324 and a pin 322. In some embodiments, the disk 324 and pin 322 are both metallic. For example gold or a gold alloy may be used for the disk 324 and pin 322. However, in other embodiments, the disk 324 and pin 322 may be made of different materials. The heat sink 330 may include an AuCuAg alloy. Although not shown, the heat sink 330 may also include a Cr layer below the AuCuAg alloy and a Cr capping layer on the AuCuAg alloy. In some embodiments, the heat sink 330 includes nominally four nanometers of Cr below and above approximately seven hundred nanometers of an alloy. The heat spreader 332 may be an Au structure. Although not shown, the heat sink 330 may also include a Cr layer below the Au layer and a Cr capping layer on the Au layer. In some embodiments, the heat spreader 332 includes nominally four nanometers of Cr below and above the Au layer. In some such embodiments, the Cr capping layer for the heat sink 330 is also the Cr bottom layer for the heat spreader 332. A layer barrier 340 provided in step 222 is also shown. The barrier layer 340 may prevent material(s) from the structures 330, 332 and/or 320 from diffusing through the barrier layer 340. In some embodiments, the barrier layer 340 may also be a barrier to diffusion of material(s) from the main pole (described below). Although depicted as a single layer, the barrier layer 340 may be a multilayer.

Figure 11:
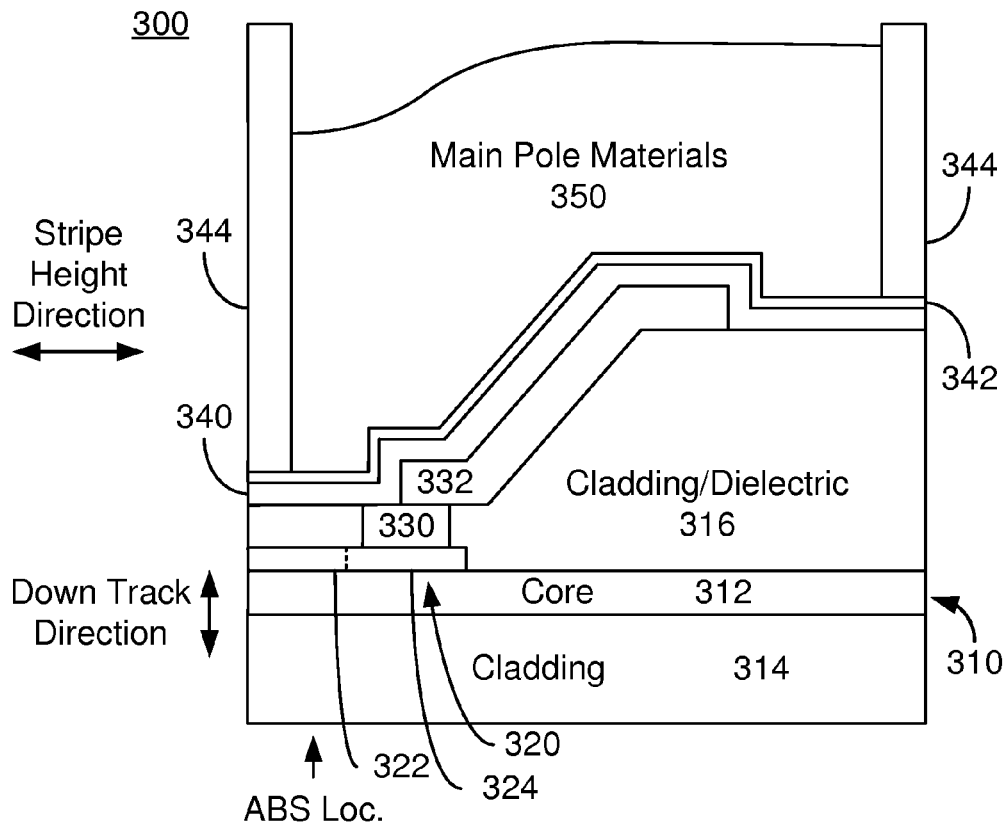

A seed layer for the main pole is provide, via step 224. In some embodiments, step 224 includes providing a magnetic seed layer. In some embodiments, a multilayer seed may be provided in step 224. For example, a bilayer of NiCr and CoFe may be deposited. The material(s) for the main pole are provided, via step 226. In some embodiments, step 226 includes providing a photoresist mask that has an aperture corresponding to the main pole. At least part of the aperture has the shape and location desired for the main pole. The magnetic materials for the main pole are also provided. For example, the main pole materials may be plated in step 224. FIG. 11 depicts the transducer 300 after step 226 is performed. Thus, a seed layer 342 provided in step 224 is shown. Also shown are mask 344 and main pole materials 350 provided in step 226. The main pole material(s) 350 are magnetic and thus may include Fe, Co and/or Ni. The saturation magnetization of the main pole material(s) 350 are desired to be high. In some embodiments, the saturation magnetization is greater than 2.3 T. In some such embodiments, the main pole saturation magnetization is 2.4 T.

Figure 12:
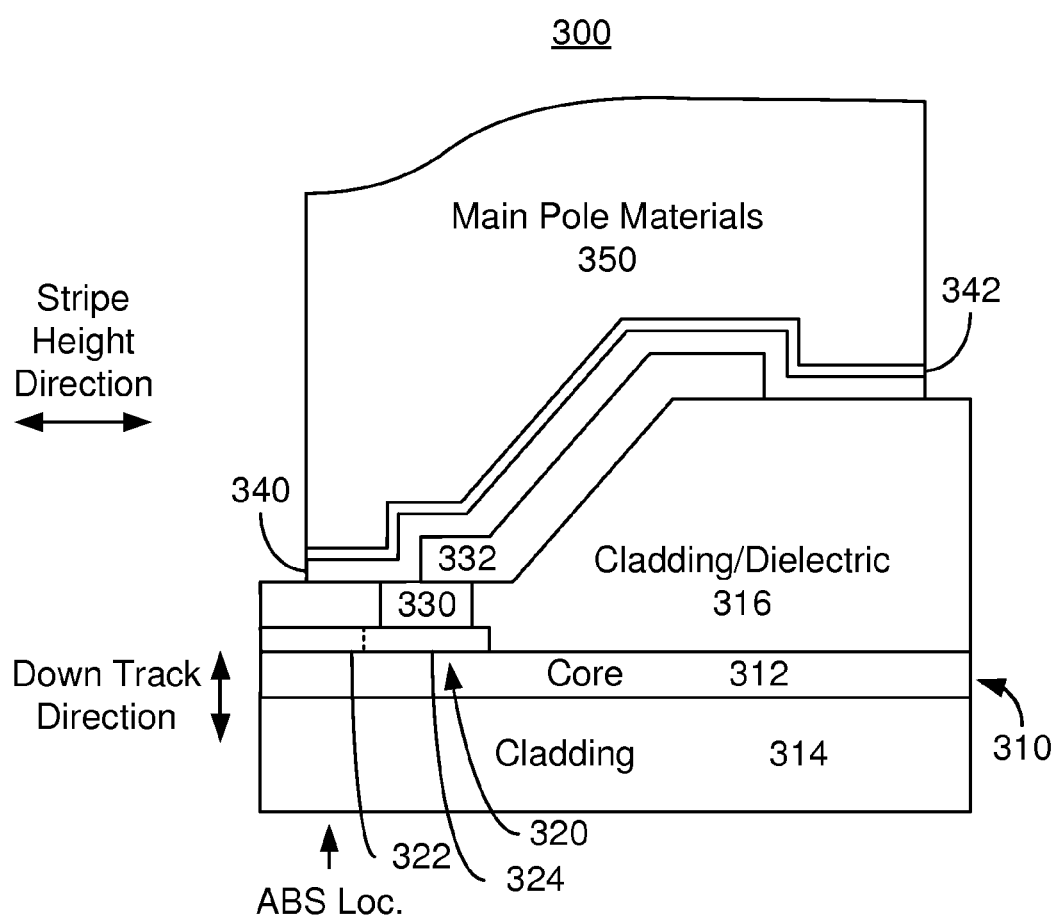

The mask 344 is removed, via step 228. Step 228 may include performing a photoresist strip. Also in step 228, portions of the seed layer 342 exposed after the removal of the mask 344 are removed. For example, an ion beam etch may be performed after the photoresist mask 344 is removed. FIG. 12 depicts the transducer 300 after step 228 is performed. Thus, the mask 344 has been removed. In addition, the seed layer 342 for the main pole material(s) 350 remains only under the main pole material(s).

Figure 13:
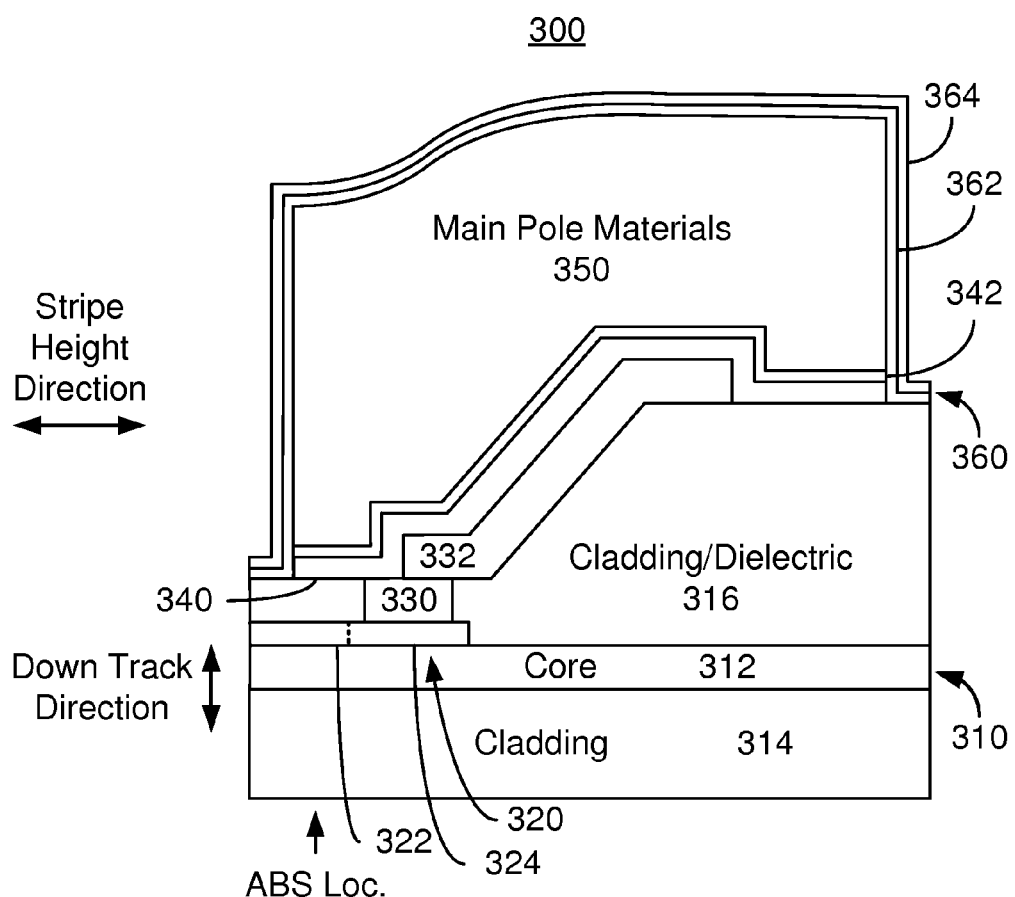

The layer(s) for the second barrier layer are deposited, via step 230. Step 230 is optional and performed only if another barrier layer, such as the barrier layer 180/180' depicted in FIGS. 1-3B, is to be provided. Referring back to FIGS. 9-18, the barrier layer deposited in step 230 may be a barrier to Fe and/or other material(s) that may diffuse from the man pole material(s) 250. Step 230 may include depositing a desired thickness of one or more of W, Ru and other material(s) that are Fe diffusion barrier. For example, in one embodiment, four nanometers of W may be deposited in step 230. In some embodiments, an oxygen diffusion barrier may also be provided in step 230. FIG. 13 depicts the transducer 350 after step 230 is performed. Thus, barrier layers 362 and 364 are shown. In this embodiment, two barrier layers 362 and 364 are shown. The barrier layer 362 may be a W layer that is a gold and Fe barrier layer, while the layer 364 may be a Ru oxygen barrier layer. In other embodiments, barrier layer 364 may be a gold and Fe barrier layer, while the layer 362 may be a Ru oxygen barrier layer. In another embodiments, another number of layers (fewer or more) may be deposited in step 230. In the embodiment shown, the barrier layers 362 and 364 may be full film deposited and thus cover the device area.

Figure 14:
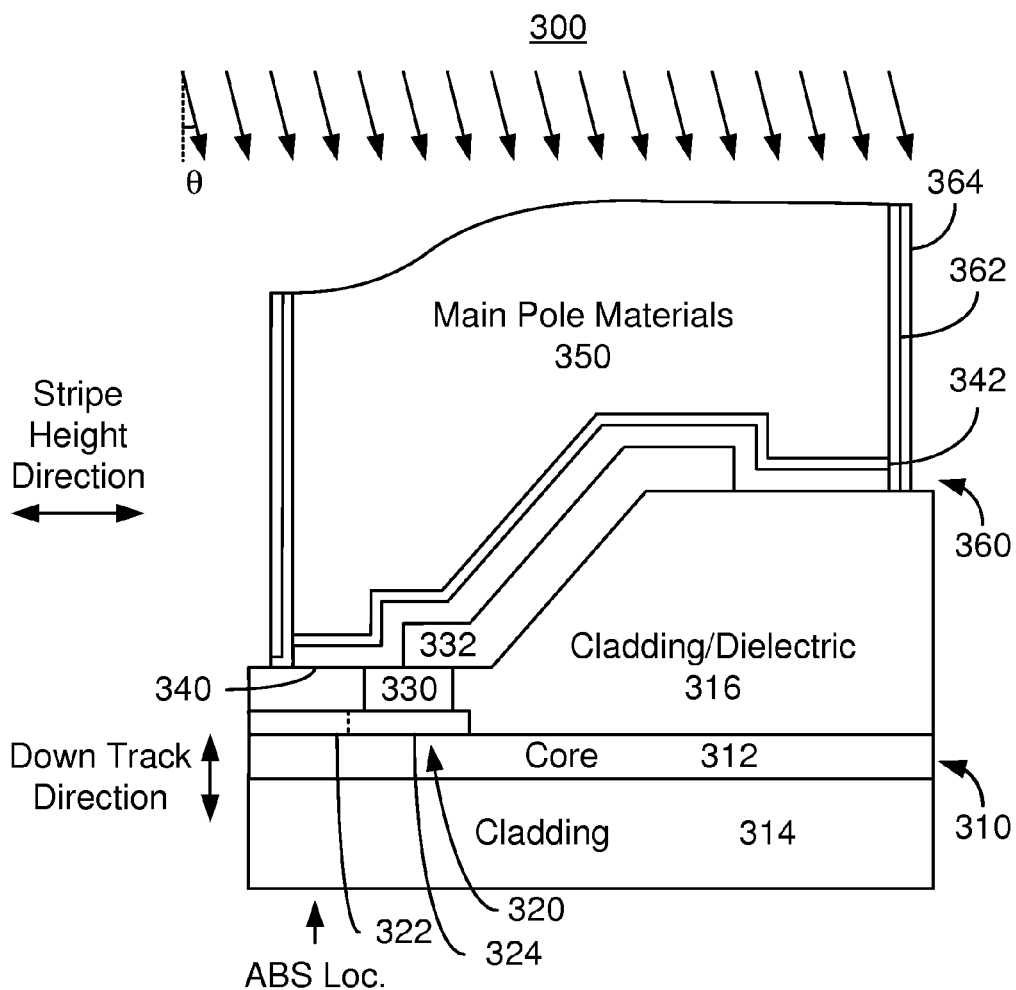

The portion of the barrier layers 362 and 364 that are on the top of the main pole material(s) 350 are removed, via step 232. In some embodiments, step 232 is an anisotropic removal step. Thus, the part of the barrier layers 362 and 364 on vertical or near vertical surfaces remain, while the part of the barrier layers 362 and 364 on horizontal or substantially horizontal surfaces is removed. In this case, a horizontal surface is substantially perpendicular to the ABS. For example step 232 may include performing an ion beam etch at an angle near perpendicular to the horizontal surface. In some embodiments, the ion beam may be at an angle of not more than ten degrees from normal to the horizontal surfaces. FIG. 14 depicts the transducer 250 during step 232. The ion beam is shown by arrows at an angle, θ, from normal to the horizontal surfaces. As discussed above, θ may not exceed ten degrees. The portion of the layers 362 and 364 has also been removed from the top of the main pole material(s) 350 and adjacent regions on top of the dielectric 316.

Figure 15:
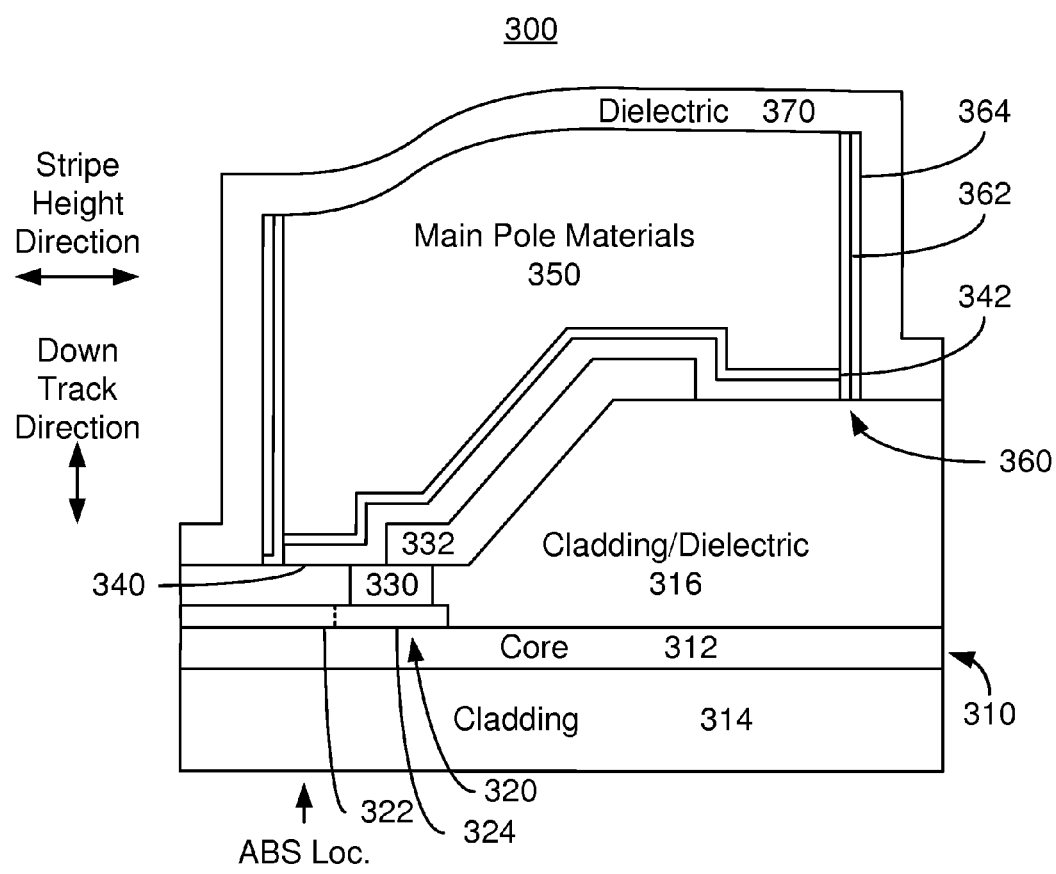

A dielectric spacer layer is deposited, via step 234. Step 234 may include depositing a layer of silicon dioxide. For example, at least twenty nanometers and not more than eighty nanometers may be deposited. In some embodiments, nominally sixty nanometers are deposited. FIG. 15 depicts the transducer 300 after step 234 is performed. Thus, the dielectric layer 370 is shown.

Figure 16:
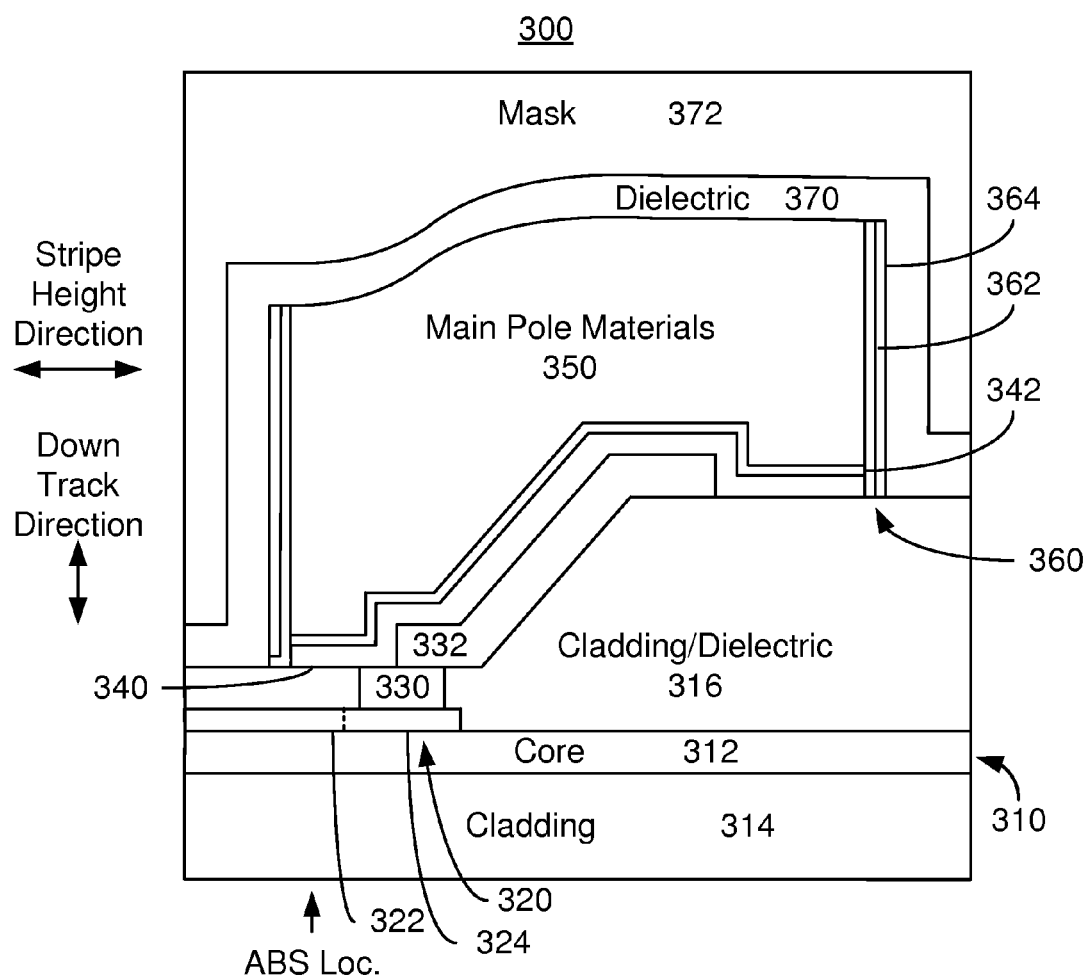

The region around the main pole material(s) 350 may be covered by a mask and a field etch may be carried out, via step 236. For example, a reactive ion etch may be performed in step 236. Thus, unwanted portions of the additional dielectric 370 and barrier layer(s) 340, 362 and/or 364 may be removed from the field. FIG. 16 depicts the transducer 300 after this step. Thus, the mask 372 is shown. Also in step 236, a wet etch may be performed to remove magnetic materials in the field region and fencing removed from the edges of the barrier layers 362 and 364.

Figure 17:
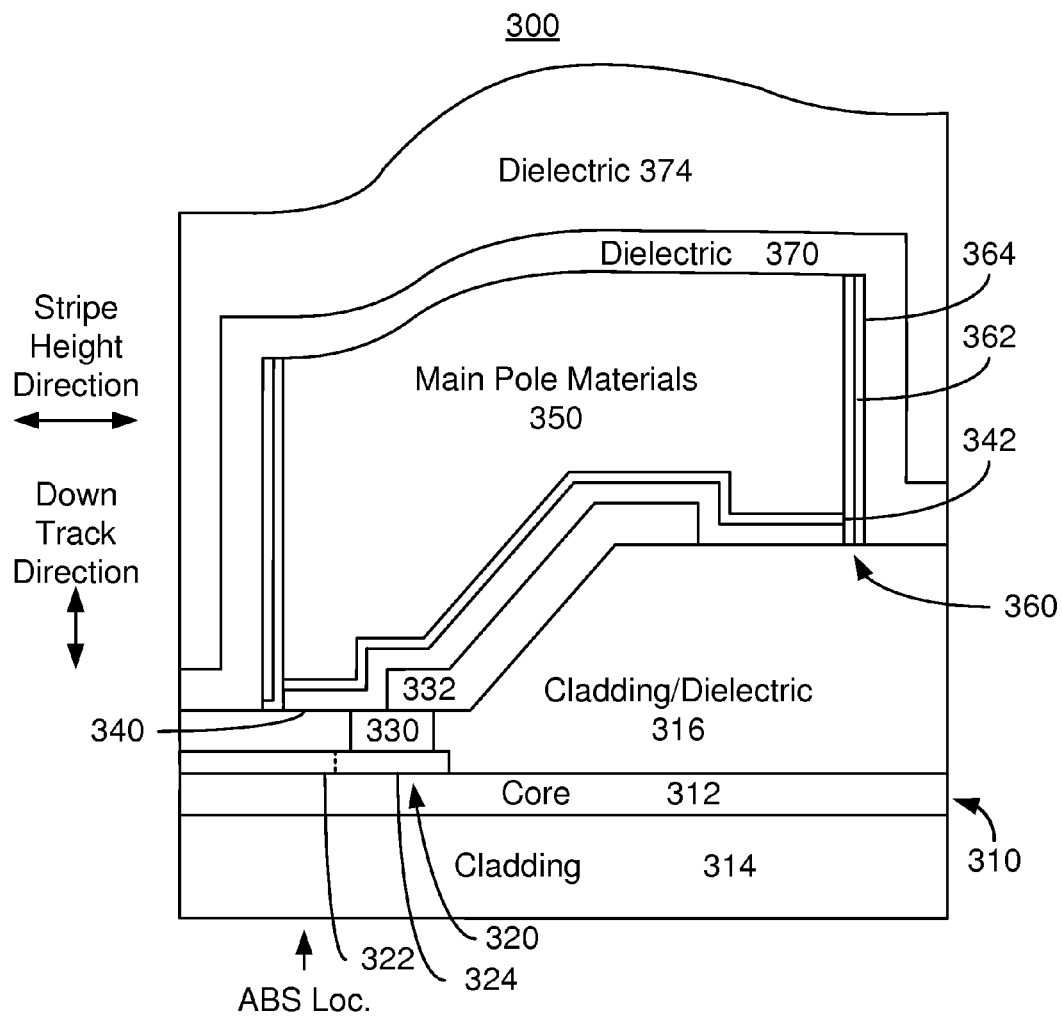

A dielectric refill step is performed, via step 238. The mask 372 may thus be removed and a dielectric deposited. In some embodiments, silicon dioxide is deposited. For example, physical vapor deposition may be used. FIG. 17 depicts the transducer 300 after step 238 is performed. Thus, the dielectric 374 has been provided.

Figure 18:
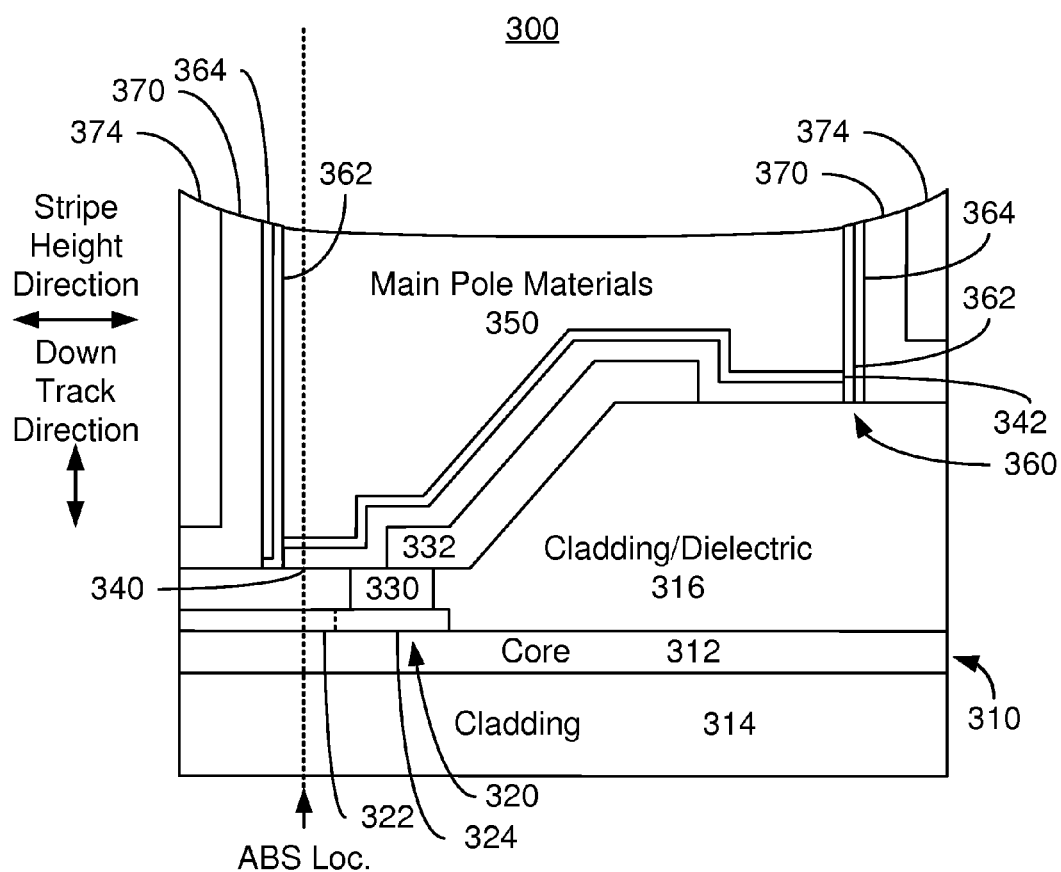

A planarization is performed, via step 240. In some embodiments, a chemical mechanical planarization (CMP) is carried out in step 240. Thus, the topography of the transducer 300 may be planarized. In addition, a portion of the main pole material(s) 350 may be removed to provide a pole of the desired height. FIG. 18 depicts the transducer 300 after step 240 is performed. Thus, the main pole 350 has been substantially formed. Fabrication of the transducer 300 may then be completed.

Using the method 220, the HAMR transducer 300 may be fabricated. Thus, the barrier layer 340 and/or the barrier layers 362 and 364 may be provided. The barrier layers 340, 362, and/or 364 may prevent or reduce interdiffusion of materials in the transducer 300 during operation. Performance and/or reliability of the transducer 300 may thus be improved.

We claim:

1. A heat assisted magnetic recording (HAMR) write apparatus coupled with a laser for providing energy and having an air-bearing surface (ABS) configured to reside in proximity to a media during use, the HAMR write apparatus comprising:
    a waveguide optically coupled with the laser and for directing the energy from the laser toward the ABS;
    a near field transducer (NFT) proximate to the ABS, the NFT being optically coupled with the waveguide, for focusing the energy onto a region of the media and including a metal portion having a metal surface;
    a main pole configured to write to the region of the media, the main pole having atop, a bottom, and a plurality of sides;
    at least one of a first diffusion barrier layer and a second diffusion barrier layer, the first diffusion barrier layer being between at least the NFT and the bottom of the pole, the first diffusion barrier sharing having a first surface and a second surface opposite to the first surface, the first surface adjoining at least one of the metal surface of the metal portion of the NFT and an additional metal surface, the second surface adjoining the bottom of the pole, the second diffusion barrier layer being adjacent to the plurality of sides of the main pole, the first diffusion barrier layer including a barrier to diffusion of a gold-containing material, the second diffusion barrier layer including a barrier to diffusion of at least one constituent of the main pole, the first diffusion barrier layer including at least one of a W layer, a Ta layer, an indium oxide layer, a tungsten nitride layer, a titanium tungsten layer, a tungsten carbonitride layer, a tungsten disilicide layer, a titanium tungsten silicide layer and a Ni layer, the write apparatus including the first diffusion barrier; and
    at least one coil for energizing the main pole.

2. The HAMR write apparatus of claim 1 further comprising:
    a heat sink thermally coupled with the NFT and between the NFT and the main pole, the first diffusion barrier layer being between the heat sink and the main pole and being a barrier to diffusion of the heat sink to the main pole, the heat sink including the additional metal surface.

3. The HAMR write apparatus of claim 1 further comprising:
    a heat sink thermally coupled with the NFT and between the NFT and the main pole, the first diffusion barrier layer being between the heat sink and the main pole; and
    a heat spreader thermally coupled with the heat sink, at least a portion of the heat spreader adjacent to the bottom of the pole, the first diffusion barrier layer being between the heat spreader and the bottom of the main pole and being a barrier to diffusion of the heat spreader to the main pole, the heat spreader including the additional metal surface.

4. The HAMR write apparatus of claim 1 wherein the first diffusion barrier layer includes at least two sublayers.

5. The HAMR write apparatus of claim 1 further comprising:
    at least one dielectric adjacent to the plurality of sides of the main pole, the second diffusion barrier layer being between the plurality of sides of the main pole and the at least one dielectric.

6. The HAMR write apparatus of claim 5 wherein the second diffusion barrier layer includes at least two sublayers.

7. The HAMR write apparatus of claim 6 wherein the second diffusion barrier layer includes a W sublayer and a Ru sublayer on the W sublayer.

8. The HAMR write apparatus of claim 6 wherein the at least one constituent includes Fe.

9. A heat assisted magnetic recording (HAMR) disk drive comprising:
    a media;
    a slider;
    a laser for providing energy; and
    a HAMR write transducer coupled with the slider, the HAMR write transducer having air-bearing surface (ABS), a main pole, a waveguide, least one coil, a near-field transducer (NFT) and at least one of a first diffusion barrier layer and a second diffusion barrier layer, the waveguide being optically coupled with the laser and directing a portion of the energy toward the ABS, the NFT being proximate to the ABS, the NFT being optically coupled with the waveguide and for focusing the energy onto a region of the media, the NFT including a metal portion having a metal surface, a main pole configured to write to the region of the media, the main pole having a top, a bottom, and a plurality of sides, the first diffusion barrier layer being between at least the NFT and the bottom of the pole, the first diffusion barrier layer including a barrier to diffusion of a gold-containing material, the first diffusion barrier sharing having a first surface and a second surface opposite to the first surface, the first surface adjoining at least one of the metal surface of the metal portion of the NFT and an additional metal surface, the second surface adjoining the bottom of the pole, the second diffusion barrier layer being adjacent to the plurality of sides of the main pole, the second diffusion barrier layer including a barrier to diffusion of at least one constituent of the main pole, the first diffusion barrier layer includes at least one of a W layer, a Ta layer, an indium oxide layer, a tungsten nitride layer, a titanium tungsten layer, a tungsten carbonitride layer, a tungsten disilicide layer, a titanium tungsten silicide layer and a Ni layer, the HAMR write transducer including the first diffusion barrier, the at least one coil for energizing the main pole.

10. A method for fabricating a heat assisted magnetic recording (HAMR) write apparatus coupled with a laser for providing energy and having an air-bearing surface (ABS) configured to reside in proximity to a media during use, the method comprising:
    providing a waveguide optically coupled with the laser and directing a portion of the energy from the laser toward the ABS;
    providing a near field transducer (NFT) proximate to the ABS, the NFT being optically coupled with the waveguide, for focusing the energy onto a region of the media and including a metal portion having a metal surface;
    providing a main pole configured to write to the region of the media, the main pole having a top, a bottom, and a plurality of sides;
    providing at least one of a first diffusion barrier layer and a second diffusion barrier layer, the first diffusion barrier layer being between at least the NFT and the bottom of the pole, the first diffusion barrier layer including a barrier to diffusion of a gold-containing material, the first diffusion barrier sharing having a first surface and a second surface opposite to the first surface, the first surface adjoining at least one of the metal surface of the metal portion of the NFT and an additional metal surface, the second surface adjoining the bottom of the pole, the second diffusion barrier layer being adjacent to the plurality of sides of the main pole, the second diffusion barrier layer including a barrier to diffusion of at least one constituent of the main pole, the first diffusion barrier layer includes at least one of a W layer, a Ta layer, an indium oxide layer, a tungsten nitride layer, a titanium tungsten layer, a tungsten carbonitride layer, a tungsten disilicide layer, a titanium tungsten silicide layer and a Ni layer, the step of providing at least one of the first diffusion barrier and the second diffusion barrier further includes providing the first diffusion barrier; and providing at least one coil for energizing the main pole.

11. The method of claim 10 further comprising:

providing a heat sink thermally coupled with the NFT and between the NFT and the main pole, the first diffusion barrier layer being between the heat sink and the main pole and being a barrier to diffusion of the heat sink to the main pole, the heat sink including the additional metal surface.

12. The method of claim 10 further comprising:

providing a heat sink thermally coupled with the NFT and between the NFT and the main pole, the first diffusion barrier layer being between the heat sink and the main pole; and providing a heat spreader thermally coupled with the heat sink, at least a portion of the heat spreader adjacent to the bottom of the pole, the first diffusion barrier layer being between the heat spreader and the bottom of the main pole and being a barrier to diffusion of the heat spreader to the main pole, the heat spreader including the additional metal surface.

13. The method of claim 10 wherein the first diffusion barrier layer includes at least two sublayers.

14. The method of claim 10 further comprising:

providing at least one dielectric adjacent to the plurality of sides of the main pole, the second diffusion barrier layer being between the plurality of sides of the main pole and the at least one dielectric, the second diffusion barrier layer including a barrier to diffusion of at least one constituent of the main pole to the at least one dielectric.

15. The method of claim 14 wherein the step of providing the at least one of the first diffusion barrier layer and the second diffusion barrier layer includes providing the second diffusion barrier layer, the step of providing the second diffusion barrier layer further includes:

depositing a layer including the barrier to diffusion on the top and the plurality of sides of the main pole;

ion milling at least the barrier on the top of the main pole at a milling angle, the milling angle being at least zero and not more than ten degrees from normal to a substrate surface, a portion of the barrier on top of the main pole being removed; and depositing a dielectric covering the main pole and the second diffusion barrier layer.

16. The method of claim 15 wherein the step of providing the second diffusion barrier layer further includes:

depositing an oxygen barrier layer on the layer.

17. The method of claim 16 wherein the barrier includes a W sublayer and the oxygen barrier layer includes a Ru sublayer.

18. The HAMR write apparatus of claim 1 wherein the apparatus includes the first diffusion barrier layer and the second diffusion barrier layer, the second diffusion barrier layer includes a barrier to diffusion of at least one constituent of the main pole, the first barrier layer extending along the bottom of the main pole from the ABS to the back of the main pole, a portion of the second diffusion barrier layer being adjacent to the back of the main pole.

19. The HAMR disk drive of claim 9 wherein the HAMR transducer includes the first diffusion barrier layer and the second diffusion barrier layer, the second diffusion barrier layer includes a barrier to diffusion of at least one constituent of the main pole, the first diffusion barrier layer extending along the bottom of the main pole from the ABS to the back of the main pole, a portion of the second diffusion barrier layer being adjacent to the back of the main pole.

20. The method of claim 10 wherein the HAMR transducer includes the first diffusion barrier layer and the second diffusion barrier layer, the second diffusion barrier layer includes a barrier to diffusion of at least one constituent of the main pole, the first diffusion barrier layer extending along the bottom of the main pole from the ABS to the back of the main pole, a portion of the second diffusion barrier layer being adjacent to the back of the main pole.

* * * * *